(12) United States Patent
Wang et al.

(10) Patent No.: US 12,294,572 B2
(45) Date of Patent: May 6, 2025

(54) INFORMATION VERIFICATION METHOD AND RELATED APPARATUS, DEVICE, AND STORAGE MEDIUM FOR LOGGING IN TO A SERVER OF A TARGET APPLICATION WITHOUT EXPOSING PRIVACY INFORMATION OF A USER TO THE TARGET APPLICATION

(71) Applicant: TENCENT TECHNOLOGY (SHENZHEN) COMPANY LIMITED, Guangdong (CN)

(72) Inventors: Ben Wang, Shenzhen (CN); Xu Wang, Shenzhen (CN); Xiangkai Zeng, Shenzhen (CN); Junhao Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 368 days.

(21) Appl. No.: 17/977,407

(22) Filed: Oct. 31, 2022

(65) Prior Publication Data
US 2023/0071847 A1 Mar. 9, 2023

Related U.S. Application Data

(63) Continuation of application No. PCT/CN2022/080538, filed on Mar. 14, 2022.

(30) Foreign Application Priority Data
Apr. 2, 2021 (CN) .......................... 202110360917.2

(51) Int. Cl.
H04L 9/40 (2022.01)
(52) U.S. Cl.
CPC ................................ H04L 63/045 (2013.01)

(58) Field of Classification Search
CPC ....... H04L 63/045; H04L 63/06; H04L 63/08; H04L 63/0807; G06F 21/31; G06F 21/46
(Continued)

(56) References Cited

U.S. PATENT DOCUMENTS

2006/0041938 A1* 2/2006 Ali ................... G06Q 20/40975
726/14
2021/0014256 A1* 1/2021 Malhotra ............ H04L 63/1433

FOREIGN PATENT DOCUMENTS

CN 103391292 A 11/2013
CN 104065652 A 9/2014
(Continued)

OTHER PUBLICATIONS

Translation of the Written Opinion issued May 7, 2022 in International Application No. PCT/CN2022/080538.
(Continued)

*Primary Examiner* — Bryan F Wright
(74) *Attorney, Agent, or Firm* — Sughrue Mion, PLLC

(57) ABSTRACT

An information verification method based on a cloud security technology is provided. Before transmitting to-be-verified information including user information, a terminal device performs encryption processing on the to-be-verified information by using random numbers and a public key issued by a verification server, to obtain to-be-verified ciphertext information, which is to be used throughout transmission for logging into a server of a third-party application. The server of the third-party application cannot decrypt the to-be-verified information and the to-be-verified information may be obtained only by the verification server. The verification server transmits an application login success message to the terminal device based on decryption processing on the to-be-verified ciphertext information. In this way, the server of the third-party application may be logged in to without exposing privacy information of a user (Continued)

to the third-party application, thereby improving the security of identity verification.

20 Claims, 14 Drawing Sheets

(58) Field of Classification Search
USPC .......................................................... 726/26
See application file for complete search history.

(56) References Cited

FOREIGN PATENT DOCUMENTS

| | | |
|---|---|---|
| CN | 109600223 A | 4/2019 |
| CN | 111193695 A | 5/2020 |
| CN | 112118223 A | 12/2020 |
| CN | 112733107 A | 4/2021 |

OTHER PUBLICATIONS

Extended European Search Report issued Apr. 15, 2024 in European Application No. 22778533.4.
Anonymous, "Do you still need to use digest authentication if you are on SSL?" Aug. 12, 2012, XP093147664 (1 page total), Accessed via the Internet: https://stackoverflow.com/questions/11923607/do-you-still-need-to-use-digest-authentication-if-you-are-on-ssl.
Anonymous, "What happens during a TLS handshake?", Sep. 16, 2020, XP093147674 (3 pages total), Accessed via the Internet: https://www.cloudflare.com/en-gb/learning/ssl/what-happens-in-a-tls-handshake/.
Anonymous, "Digest access authentication", Wikipedia, Mar. 15, 2021, XP093147681 (9 pages total), Accessed via the Internet: https://en.wikipedia.org/w/index.php?title=Digest_access_authentication&oldid=1012280831.
First Office Action of CN 202110360917.2 dated May 13, 2021.
International Search Report of PCT/CN2022/080538 dated May 7, 2022 [PCT/ISA/210].
Written Opinion of PCT/CN2022/080538 dated May 7, 2022 [PCT/ISA/237].

* cited by examiner

INFORMATION VERIFICATION METHOD AND RELATED APPARATUS, DEVICE, AND STORAGE MEDIUM FOR LOGGING IN TO A SERVER OF A TARGET APPLICATION WITHOUT EXPOSING PRIVACY INFORMATION OF A USER TO THE TARGET APPLICATION

CROSS-REFERENCE TO RELATED APPLICATION(S)

This application is a continuation application of International Application No. PCT/CN2022/080538, filed Mar. 14, 2022, which claims priority to Chinese Patent Application No. 202110360917.2, filed with the National Intellectual Property Administration, PRC on Apr. 2, 2021, the disclosures of which are herein incorporated by reference in their entireties.

FIELD

The disclosure relates to the field of cloud security technologies, and in particular, to information verification.

BACKGROUND

The Open Authorization (OAuth) Protocol provides a secure, open, and simple standard to authorization of a user resource. Different from conventional authorization manners, authorization of the OAuth does not allow a third party to touch (or access) account information of a user (such as a user name and a password), that is, the third party can apply for authorization of the user resource without using the account information. Therefore, the OAUTH is relatively secure.

Currently, in the Oauth protocol, single hash calculation is performed on a password through a front-end program, for example, a Secure Hash Algorithm 1 (SHA-1) or a Secure Hash Algorithm 256 (SHA-256), to obtain digest information of the password, and finally the password is verified by a back-end identity authorization service according to the digest information of the password.

However, the front-end program can transmit the digest information of the password to the back-end identity authorization service only through a server of a third-party application. In such a process, the server of the third-party application may obtain account information of the user indirectly and store the digest information of the password, causing difficulty in ensuring information security.

SUMMARY

Embodiments of the disclosure provide an information verification method and related apparatus, a device, and a storage medium, to log in to a server of a third-party application without exposing privacy information of a user to the third-party application, thereby improving the security of identity verification.

In view of this, according to an aspect of an example embodiment of the disclosure, an information verification method is provided, including:
  obtaining, in response to a key agreement request a terminal device, key agreement data comprising a public key and a first random number, the key agreement request including an identifier of a target user;
  transmitting, to the terminal device, the key agreement data, based on which encryption processing is performed at the terminal device on to-be-verified information for a target application by using a second random number and the public key and the first random number included in the key agreement data, to obtain to-be-verified ciphertext information, the to-be-verified information comprising user information corresponding to the target user;
  receiving the to-be-verified ciphertext information from the terminal device;
  performing decryption processing on the to-be-verified ciphertext information, to obtain a first information digest;
  matching the first information digest with a second information digest, to obtain an information verification result, the second information digest being a stored information digest; and
  transmitting the information verification result to the terminal device, the information verification result indicating a result of logging in to an application server by the terminal device, and the application server being a server of the target application.

According to an aspect of an example embodiment of the disclosure, an information verification method is provided, including:
  transmitting, to a verification server, a key agreement request upon which key agreement data is obtained at the verification server, the key agreement request including an identifier of a target user, and the key agreement data comprising a public key and a first random number;
  receiving the key agreement data from the verification server;
  performing encryption processing on to-be-verified information for a target application by using a second random number and the public key and the first random number included in the key agreement data, to obtain to-be-verified ciphertext information, the to-be-verified information comprising user information corresponding to the target user;
  transmitting, to the verification server, the to-be-verified ciphertext information on which decryption processing is performed to obtain first information digest, and the first information digest is matched with second information digest to obtain an information verification result; and
  receiving the information verification result from the verification server, the information verification result indicating a result of logging in to an application server by the terminal device, and the application server being a server of the target application.

According to an aspect of an example embodiment of the disclosure, an information verification apparatus is provided, including:
  at least one memory configured to store program code; and
  at least one processor configured to read the program code and operate as instructed by the program code, the program code including:
  obtaining code configured to cause the at least one processor to obtain, in response to a key agreement request from a terminal device, key agreement data including a public key and a first random number, the key agreement request including an identifier of a target user;
  transmission code configured to cause the at least one processor to transmit, to the terminal device, the key agreement data based on which encryption processing is performed at the terminal device on to-be-verified information for a target application by using a second random number and the public key and the first random number included in the key agreement data, to obtain to-be-verified ciphertext information, the to-be-verified information including user information corresponding to the target user;

receiving code configured to cause the at least one processor to receive the to-be-verified ciphertext information from the terminal device;

decryption code configured to cause the at least one processor to perform decryption processing on the to-be-verified ciphertext information, to obtain a first information digest; and verification code configured to cause the at least one processor to match the first information digest with a second information digest, to obtain an information verification result, the second information digest being a stored information digest, the transmission code being further configured to cause the at least one processor to transmit the information verification result to the terminal device, the information verification result indicating a result of logging in to an application server by the terminal device, and the application server being a server of the target application.

According to an aspect of an example embodiment of the disclosure, an information verification apparatus is provided, including:

at least one memory configured to store program code; and at least one processor configured to read the program code and operate as instructed by the program code, the program code including:

transmission code configured to cause the at least one processor to transmit, to a verification server, a key agreement request upon which key agreement data is obtained at the verification server, the key agreement request including an identifier of a target user, and the key agreement data including a public key and a first random number;

receiving code configured to cause the at least one processor to receive the key agreement data from verification server; and encryption code configured to cause the at least one processor to perform encryption processing on to-be-verified information for a target application by using a second random number and the public key and the first random number included in the key agreement data, to obtain to-be-verified ciphertext information, the to-be-verified information including user information corresponding to the target user, the transmission code being further configured to cause the at least one processor to transmit, to the verification server, the to-be-verified ciphertext information on which decryption processing is performed to obtain first information digest, and the first information digest is matched with second information digest to obtain an information verification result, and the receiving code being further configured to cause the at least one processor to receive the information verification result from the verification server, the information verification result indicating a result of logging in to an application server by the terminal device, and the application server being a server of the target application.

According to an aspect an example embodiment of the disclosure, a server is provided, including: a memory, a processor, and a bus system, the memory being configured to store a program, the processor being configured to execute the program in the memory, and perform the method in the foregoing aspects according to instructions in program code; and the bus system being configured to connect the memory and the processor, to enable the memory and the processor to perform communication.

An aspect of an example embodiment of the disclosure provides a terminal device, including: a memory, a processor, and a bus system, the memory being configured to store a program, the processor being configured to execute the program in the memory, and perform the method in the foregoing aspects according to instructions in program code; and the bus system being configured to connect the memory and the processor, to enable the memory and the processor to perform communication.

According to an aspect of an example embodiment of the disclosure, a non-transitory computer-readable storage medium is provided, the computer-readable storage medium storing instructions, the instructions, when run on a computer, causing the computer to perform the method in the foregoing aspects.

According to an aspect of an example embodiment of the disclosure, a computer program product or a computer program is provided, the computer program product or the computer program including computer instructions stored in a computer-readable storage medium. A processor of a computer device reads the computer instructions from the computer-readable storage medium, and executes the computer instructions, to cause the computer device to perform the foregoing method provided in the foregoing aspects.

BRIEF DESCRIPTION OF THE DRAWINGS

To describe the technical solutions of example embodiments of the disclosure more clearly, the following briefly introduces the accompanying drawings for describing the example embodiments. The accompanying drawings in the following description show only some embodiments of the disclosure, and a person of ordinary skill in the art may still derive other accompanying drawings from these accompanying drawings without creative efforts.

DETAILED DESCRIPTION

Embodiments of the disclosure provide an information verification method and related apparatus, a device, and a storage medium, to log in to a server of a third-party application without exposing privacy information of a user to the third-party application, thereby improving the security of identity verification.

In the specification, claims, and accompanying drawings of the disclosure, the terms "first", "second", "third", "fourth", and the like (if existing) are intended to distinguish between similar objects rather than describe a specific order or sequence. It would be understood that the data termed in such a way is interchangeable in proper circumstances, so that the embodiments of the disclosure described herein, for example, may be implemented in other orders than the order illustrated or described herein. In addition, the terms "include", "corresponding to" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

The Open Authorization (OAuth) protocol is an open standard that allows a user to authorize a third-party application to access information stored on another service provider without providing a user name and a password to a third-party mobile application or sharing all data of the user. Many websites provide a function of third-party login. For example, in a case that an application (APP) or a web page accesses some third-party applications, the user often needs to log in to another cooperation platform (for example, a social application, and the like) for authorized login. Currently, in an identity verification scenario, the third-party application and an identity authorization service may be docked by using an Oauth2.0 protocol. The OAuth 2.0 defines five authorization modes, which are respectively an authorization code, an implicit mode, a resource owner password credentials mode, a client credentials mode, and an extension mode. For the resource owner password credentials mode, the third-party application needs the user to enter a user name and a password when using the identity authorization service for identity verification. As a result, the third-party application may obtain the user name and the password of the user, causing a potential risk of leaking the user password.

Figure 1:
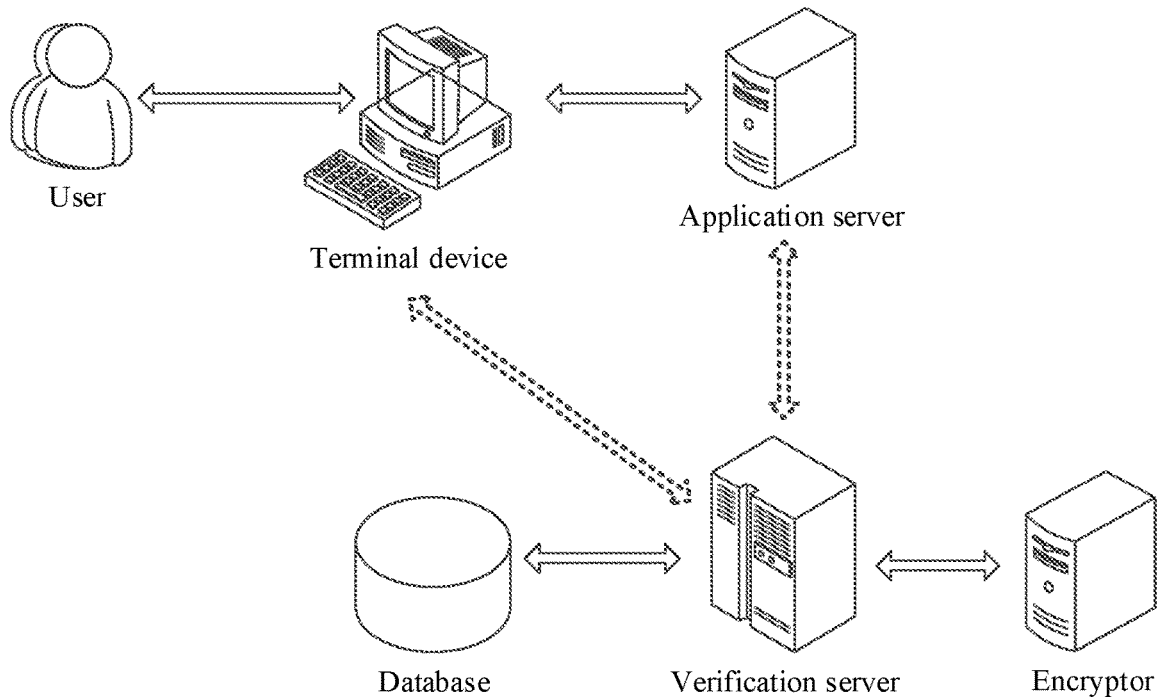
FIG. 1 is a schematic diagram of an environment of an information verification system according to an embodiment of the disclosure.

Based on this, the disclosure provides an information verification method based on an end-to-end encryption technology, which may resolve an authorization docking problem in the resource owner password credentials mode, and resolve an information verification problem in another scenario. The information verification method provided in the disclosure is applicable to an information verification system shown in FIG. 1. As shown in FIG. 1, the information verification system may include a terminal device, a server, an encryptor, and a database. A client is deployed on the terminal device. The client may include a client of the third-party application and an end-to-end client. The server includes an application server and verification server of the third-party application. The server involved in the disclosure may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. The terminal device may be a smartphone, a tablet computer, a notebook computer, a palmtop computer, a personal computer, a smart television, a smartwatch, or the like, but is not limited thereto. The terminal device and the server may be directly or indirectly connected in a wired or wireless communication manner. This is not limited in the disclosure. The quantities of servers and terminal devices are not limited.

When the user needs to log in to the third-party application, a login request to the application server may be initiated through the terminal device, to-be-verified information may be entered through the terminal device, and the to-be-verified information is encrypted by the terminal device by using key agreement data, to generate to-be-verified ciphertext information. In an implementation, the terminal device may transmit the to-be-verified ciphertext information to the application server of the third-party application, and the application server of the third-party application forwards the to-be-verified ciphertext information to the verification server. In another implementation, the terminal device directly transmits the to-be-verified ciphertext information to the verification server. Then, the verification server invokes an encryptor to perform decryption processing on the to-be-verified ciphertext information, to obtain a first information digest of the to-be-verified information, and invokes a database to compare the first information digest with a stored information digest (for example, a second information digest), so that an information verification result is obtained. Finally, the information verification result is transmitted to the terminal device, and an identity verification process is completed.

The execution process of the verification server may also be implemented by a cloud server, and identity verification related to cloud security may be implemented through the cloud server. Cloud security is a general name of security software, hardware, users, institutions, and security cloud platforms based on a cloud computing business model application. Cloud security integrates emerging technologies and concepts such as parallel processing, grid computing, and unknown virus behavior judgment. An abnormal behavior of software in a network is detected through a large number of mesh clients to obtain latest information of Trojans and malicious programs in the Internet, the latest information is transmitted to the server for automatic analysis and processing, and then solutions of viruses and Trojans are delivered to each client.

The main research directions of cloud security include: 1. Cloud computing security: It mainly studies how to ensure cloud security and security of various applications on the cloud, including cloud computer system security, secure storage and isolation of user data, user access authentication, information transmission security, network attack protection, compliance audit, and the like. 2. Cloudification of security infrastructure: It mainly studies how to use cloud computing to build and integrate security infrastructure resources and optimize a security protection mechanism, including constructing an ultra-large-scale security incident and an information acquisition and processing platform, to acquire and associatively analyzes massive information, thereby improving the capability for controlling security incidents in the whole network and the risk control capability. 3. Cloud security service: It mainly studies various security services provided for users based on a cloud computing platform, for example, an antivirus service, and the like.

The cloud security is an important part of a cloud technology. The cloud technology refers to a hosting technology that unifies a series of resources such as hardware, software, and networks in a wide area network or a local area network to implement computing, storage, processing, and sharing of data. The cloud technology is a collective name of a network technology, an information technology, an integration technology, a management platform technology, an application technology, and the like based on an application of a cloud computing business mode, and may form a resource pool, which is used as required, and is flexible and convenient. A cloud computing technology becomes an important support. A background service of a technical network system requires a large amount of computing and storage resources, such as a video website, an image website, and more portal websites. As the Internet industry is highly developed and applied, each article may have an identifier in the future and needs to be transmitted to a background system for logical processing. Data at different levels is separately processed, and data in various industries requires strong system support, which may only be implemented by using cloud computing.

Figure 2:
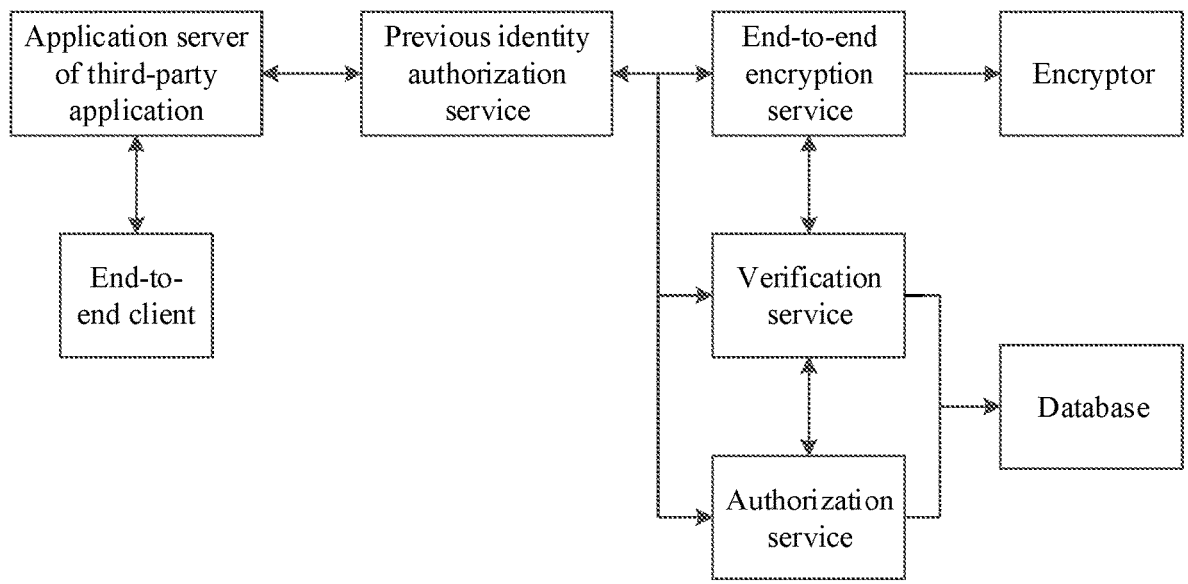
FIG. 2 is a schematic diagram of an application architecture of an information verification system according to an embodiment of the disclosure.

With reference to the information verification system shown in FIG. 1 and for ease of understanding, refer to FIG. 2. FIG. 2 is a schematic diagram of an application architecture of an information verification system according to an embodiment of the disclosure. As shown in FIG. 2, a third-party application and an end-to-end client are deployed on the terminal device. The user may automatically pull up the end-to-end client when enabling the third-party application, and the user enters to-be-verified information through the end-to-end client. Definitions of application parts of the information verification system are described below.

1. Third-party application: It is an application such as a web page or client, for example, an e-commerce platform, a game platform, or the like.
2. Application server of third-party application: It is a server configured to provide a third-party application service, for example, a website server with login logic.
3. End-to-end client: It is a program for a third-party application to invoke. For example, a front end of the third-party application is a web mode, and the end-to-end client may be a JavaScript (JS) program or an applet. In another example, the front end of the third-party application is an application, for an Android system, the end-to-end client may be a Java Archive (JAR) package, and for an iPhone operation system (iOS) developed by Apple, the end-to-end client may be a so dynamic library.
4. Previous identity authorization service: It is used for providing a function of docking and communicating with a third-party application, and is responsible for docking with an overall access layer, which is equivalent to a "gateway" function.
5. End-to-end encryption service: It is used for implementing an end-to-end encryption key agreement function and has a capability for docking with an encryptor, where the end-to-end encryption service is deployed on the verification server.
6. Verification service: It is used for providing an identity verification service, for example, verifying correctness of a user name and a password, where the verification service is deployed on the verification server.
7. Authorization service: It is a service for providing full life cycle management for a token, for example, token issuance, token verification, token invalidation verification, and the like, where the authorization service is deployed on the verification server.
8. Encryptor: It is an encryptor that meets requirements of the State Cryptography Administration and is configured to provide basic capabilities such as encryption and decryption and a key security storage capability, which may implement full life cycle management of the key.
9. Database: It is a server for data storage.

Figure 3:
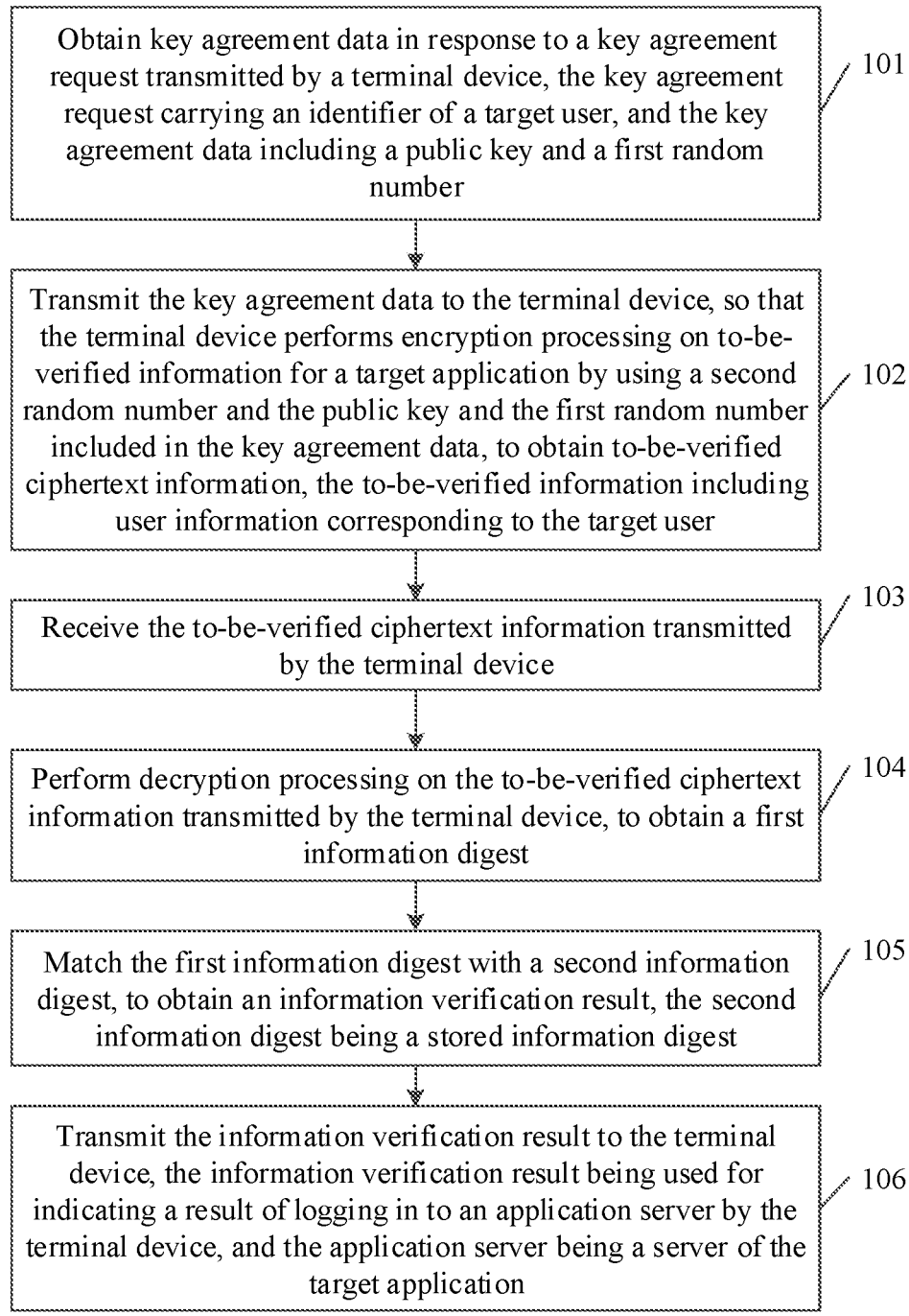
FIG. 3 is a schematic diagram of an embodiment of an information verification method according to the embodiments of the disclosure.

The information verification method provided in the disclosure is described below with reference to the foregoing description from the perspective of the verification server. Referring to FIG. 3, an embodiment of the information verification method provided in the embodiments of the disclosure includes 101-106:

101: A verification server obtains key agreement data in response to a key agreement request transmitted by a terminal device, the key agreement request carrying an identifier of a target user, and the key agreement data including a public key and a first random number.

In an example embodiment, the public key and the first random number are generated by an encryptor.

In this embodiment, the target user may automatically pull up an end-to-end client when enabling a third-party application on the terminal device, so that the terminal device transmits the key agreement request to the verification server through the end-to-end client. The key agreement request carries the identifier of the target user. Based on this, the verification server may establish a session to communicate with the terminal device. The verification server invokes the encryptor according to the key agreement request, to generate the key agreement data required for current key agreement. In other words, the encryptor generates the key agreement data and feeds back the data to the verification server. The key agreement data includes a public key (pubkey) and a first random number (random). The first random number (random) may be a random number consists of American Standard Code for Information Interchange (ASCII).

Figure 4:
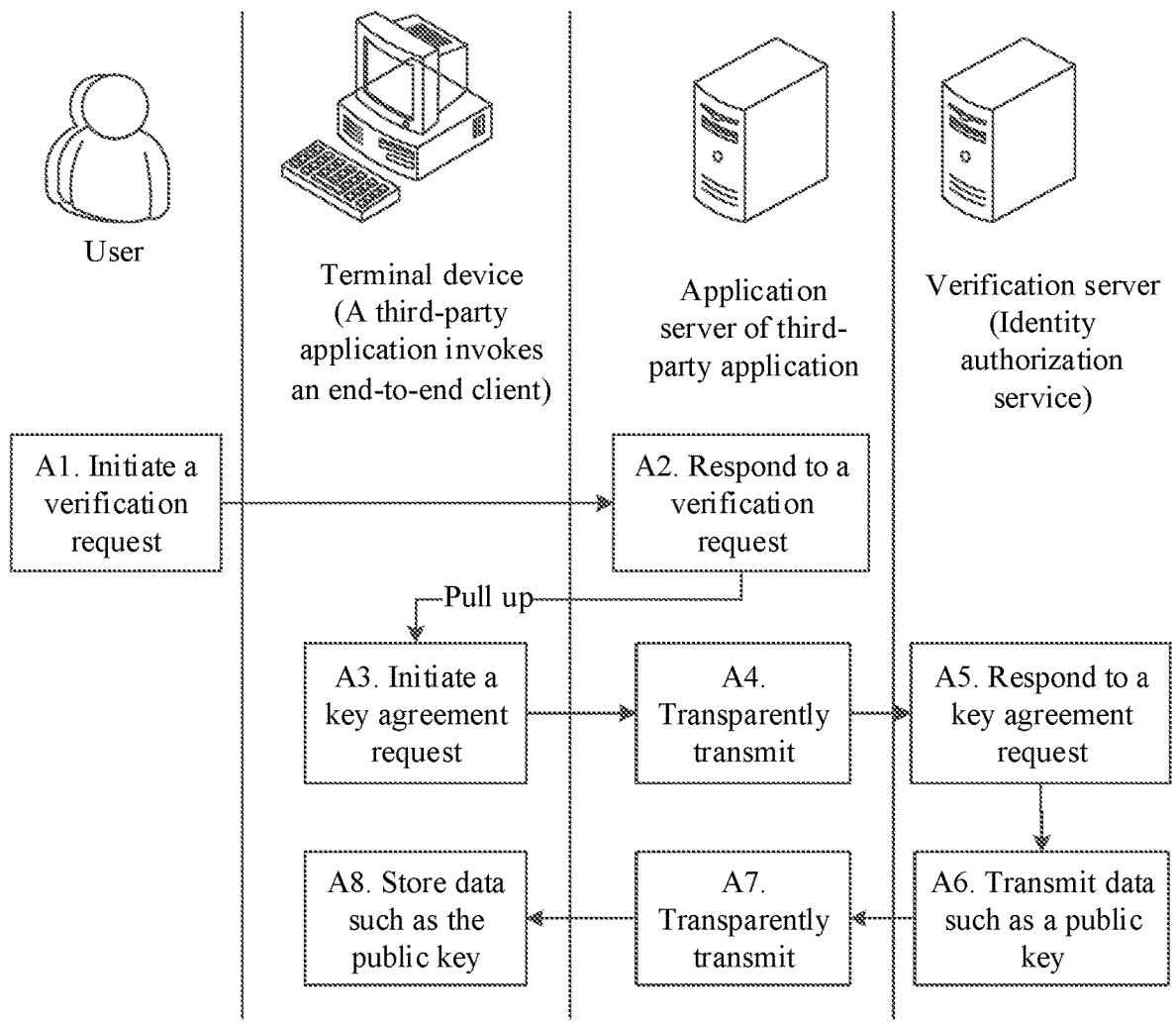
FIG. 4 is a schematic flowchart of key agreement according to an embodiment of the disclosure.

For ease of understanding, a key agreement process is described below with reference to FIG. 4. FIG. 4 is a schematic flowchart of key agreement according to an embodiment of the disclosure. As shown in the figure, the process may include the following steps A1-A8:

In Step A1, a user opens a third-party application and initiates an authentication request to an application server of the third-party application through the third-party application (that is, a client, a web page, or the like).

In step A2, the application server of the third-party application transmits a scheduling request to the third-party application in response to the authentication request, so that the third-party application responds to the scheduling request and activates an end-to-end client.

In step A3, the end-to-end client deployed on a terminal device initiates a key agreement request to the application server of the third-party application. In an example embodiment, the end-to-end client deployed on the terminal device may also directly initiates the key agreement request to a verification server (where in such an optional manner, step A5 may be directly performed).

In step A4, the application server of the third-party application transparently transmits the key agreement request to the verification server, where transparent transmission means that during communication, transmitted content is only transmitted from a source address to a destination address, and no changed is made to content of service data.

In step A5, the verification server responds to the key agreement request and invokes the encryptor to obtain key agreement data, where the key agreement data includes a public key (pubkey), a first random number (random), and the like.

In step A6, the verification server transmits the key agreement data such as the public key (pubkey), the first random number (random), and the like to the application server of the third-party application.

In step A7, the key agreement data is transparently transmitted to the terminal device by the application server of the third-party application, where the key agreement data is received by the end-to-end client deployed on the terminal device.

In step A8, the key agreement data is locally stored in the terminal device.

102: The verification server transmits the key agreement data to the terminal device, so that the terminal device performs encryption processing on to-be-verified information for a target application by using a second random number and the public key and the first random number included in the key agreement data, to obtain to-be-verified ciphertext information, the to-be-verified information including user information corresponding to the target user.

In an example embodiment, the second random number is generated by the terminal device.

In this embodiment, the verification server transmits the key agreement data to the terminal device, so that the end-to-end client deployed on the terminal device performs encryption processing on to-be-verified information entered by the target user by using a second random number (challenge) and the public key (pubkey) and the first random number (random) included in the key agreement data, to obtain the to-be-verified ciphertext information, where the second random number (challenge) may be a random number consists of ASCII. It would be understood that, in a case that the target user intends to log in to a third-party application, user information required for logging in to the target application needs to be entered, that is, to-be-verified information, where the to-be-verified information includes the user information of the target user, for example, a user name, a user account, a user password, a user mobile phone number, a user mailbox, and a user ID number. This is not limited herein.

In an embodiment, the to-be-verified ciphertext information is a "digital envelope". The "digital envelope" is a method for delivering symmetric keys through an asymmetric encryption result, which is a technology to achieve information confidentiality verification. A message (where the message is similar to content on stationery) is encrypted by using a symmetric encryption algorithm, the symmetric keys (which is similar to an envelope) are encrypted by using an asymmetric encryption algorithm, and the envelope wraps the stationery, thereby ensuring security of the message.

103: The verification server receives the to-be-verified ciphertext information transmitted by the terminal device.

In this embodiment, the terminal device transmits the to-be-verified ciphertext information to the verification server. Since the to-be-verified ciphertext information is encrypted to-be-verified information, the application server of the third-party application cannot directly obtain the to-be-verified information.

In an example embodiment, the verification server may further obtain a session identifier transmitted by the terminal device. The session identifier is an identifier of a session, and a session is generated on the verification server after every time of visiting the verification server, so that identity verification for the target user may be performed in the same session.

104: The verification server performs decryption processing on the to-be-verified ciphertext information transmitted by the terminal device, to obtain a first information digest.

In this embodiment, for example, the verification server may obtain a corresponding public key (pubkey) according to the session identifier, and perform decryption processing on the to-be-verified ciphertext information by using the public key (pubkey), to obtain the first information digest corresponding to the to-be-verified information. Considering that directly decrypting the to-be-verified information is not secure, the first information digest is obtained herein. Therefore, the verification server may not directly obtain the to-be-verified information, but invokes the encryptor to perform decryption processing on the to-be-verified ciphertext information to obtain the first information digest, and obtains a second information digest corresponding to the target user from a database according to the session identifier.

It would be understood that, the target user may fill in corresponding information when registering, for example, a user name, a user account, a user password, a user mobile phone number, a user mailbox, and a user ID number. This is not limited herein. Based on this, the verification server may invoke the encryptor to generate the second information digest corresponding to registration information.

105: The verification server matches the first information digest with a second information digest, to obtain an information verification result, the second information digest being a stored information digest.

In this embodiment, the verification server compares the first information digest with the second information digest to obtain a comparison result. The comparison result is the information verification result.

Figure 5:
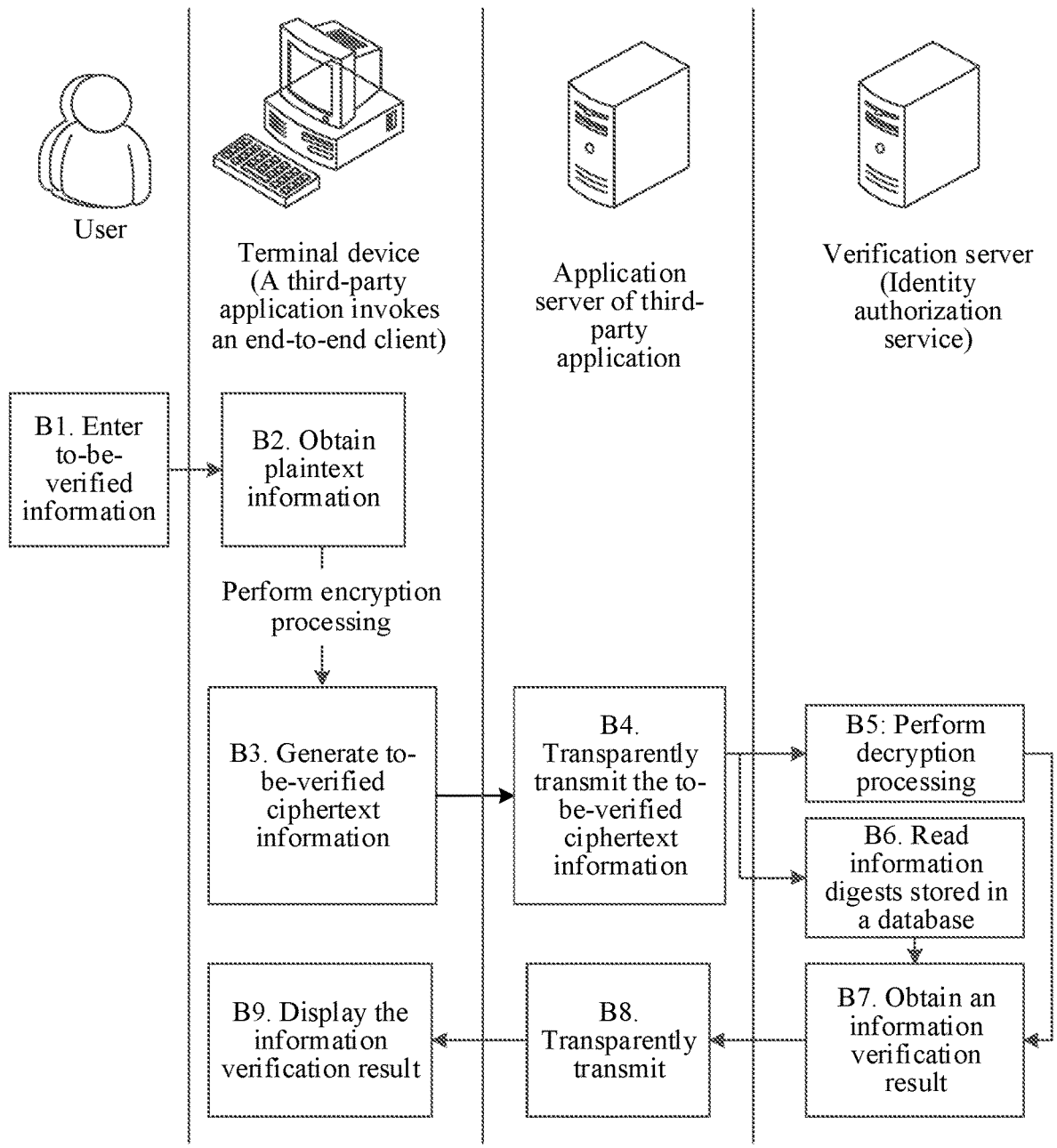
FIG. 5 is a schematic flowchart of information verification according to an embodiment of the disclosure.

For ease of understanding, an information verification process is described below with reference to FIG. 5. FIG. 5 is a schematic flowchart of information verification according to an embodiment of the disclosure. As shown in the figure, the process may include the following steps B1-B9:

In step B1, the target user opens a third-party application, and pulls up an end-to-end client through the third-party application (that is, a client, a web page, or the like), so that the user enters to-be-verified information through the end-to-end client.

In step B2, the end-to-end client obtains to-be-verified information for a plaintext.

In step B3, the end-to-end client performs encryption processing on the to-be-verified information by using a second random number (challenge), a public key (pubkey), and a first random number (random), to obtain to-be-verified ciphertext information.

In step B4, the end-to-end client transmits the to-be-verified ciphertext information to the application server of the third-party application through a Hyper Text Transfer Protocol over Secure Socket Layer (HTTPS). The application server transparently transmits the to-be-verified ciphertext information to the verification server through a secure sockets layer (SSL).

In step B5, the verification server invokes the encryptor to perform decryption processing on the to-be-verified ciphertext information, to obtain a first information digest.

In step B6, the verification server invokes a database to obtain a second information digest.

In Step B7, the first information digest and the second information digest are compared to obtain an information verification result.

In step B8, the application server of the third-party application transparently transmits the information verification result to the terminal device, and an end-to-end client deployed on the terminal device receives the information verification result.

In step B9, the information verification result is displayed through the end-to-end client deployed on the terminal device.

106: The verification server transmits the information verification result to the terminal device, the information verification result being used for indicating a result of logging in to an application server by the terminal device, and the application server being a server of the target application.

In this embodiment, the verification server transmits the information verification result to the terminal device, and then the terminal device may display the information verification result. In an embodiment, in a case that the information verification result indicates that verification succeeds, it indicates that the target user may log in to the application server of the third-party application through the terminal device. In a case that the information verification result indicates that verification fails, it indicates that the target user cannot log in to the application server of the third-party application through the terminal device.

An information verification method is provided in the embodiments of the disclosure. In the foregoing mode, before transmitting the to-be-verified information, the terminal device performs encryption processing on the to-be-verified information by using the random numbers and the public key issued by the verification server, to obtain the to-be-verified ciphertext information, so that the to-be-verified ciphertext information is used throughout transmission. In addition, a server of a third-party application cannot decrypt the to-be-verified information even if the to-be-verified ciphertext information is obtained, and the to-be-verified information may be obtained only by the verification server. In this way, the server of the third-party application may be logged in to without exposing privacy information of a user to the third-party application, thereby improving the security of identity verification.

In an example embodiment, based on the embodiment corresponding to FIG. 3, in another optional embodiment provided in the embodiments of the disclosure, obtaining, by a verification server, key agreement data may include:

transmitting, by the verification server, a ciphertext generation request to an encryptor, so that the encryptor generates ciphertext data in response to the ciphertext generation request, the ciphertext data including the public key and the first random number;

receiving, by the verification server, the ciphertext data transmitted by the encryptor; and generating, by the verification server, the key agreement data according to the public key and the first random number included in the ciphertext data.

A manner of performing key agreement between an end-to-end client and a verification server is described in this embodiment. The verification server may invoke an encryptor to obtain ciphertext data, that is, transmits a ciphertext generation request to the encryptor, so that the encryptor generates the ciphertext data according to the ciphertext generation request. The ciphertext data includes a public key (pubkey) and a first random number (random), and the public key (pubkey) and the first random number (random) are a part of the key agreement data. Based on this, the verification server obtains the key agreement data.

Figure 6:
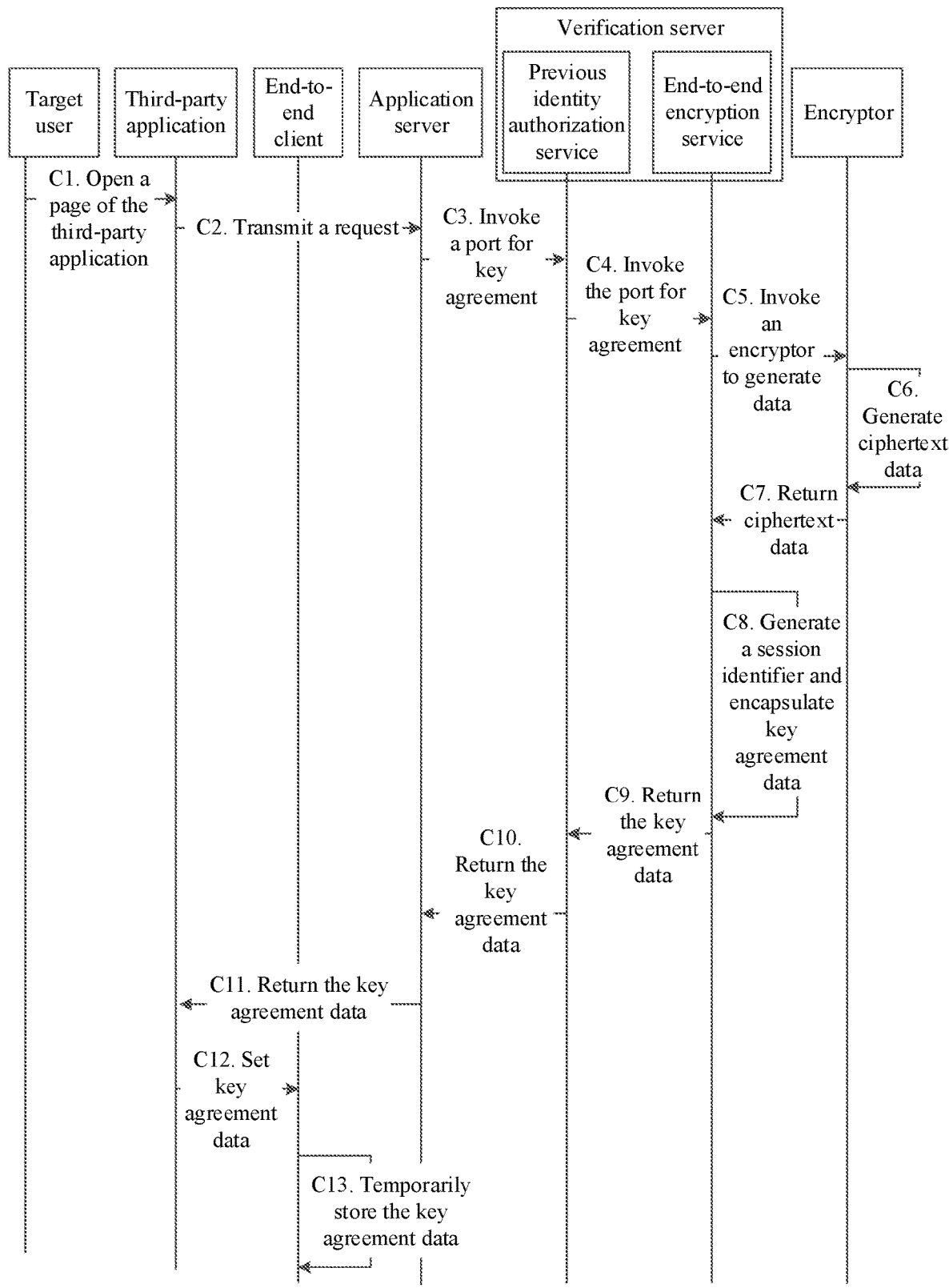
FIG. 6 is a schematic diagram of an overall process of key agreement according to an embodiment of the disclosure.

For ease of understanding, refer to FIG. 6. FIG. 6 is a schematic diagram of an overall process of key agreement according to an embodiment of the disclosure. As shown in the figure, the process may include the following steps C1-C13:

In step C1, the target user opens a page or a client of the third-party application.

In step C2, the page or the client of the third-party application transmits an HTTPS request to the application server of the third-party application.

In step C3, the application server invokes an API of the verification server, where a precondition for invoking is that a developer of the third-party application applies to the verification server for an application key index (AppKey) and a first application key (AppSecret) for docking in advance, and the verification server may authenticate through the application key index (AppKey) and the first application key (AppSecret).

In step C4, the verification server includes a previous identity authorization service and an end-to-end encryption service, where after authenticating an invoke request from the third-party application, the previous identity authorization service invokes an interface of end-to-end encryption service, to request for key agreement.

In step C5, the end-to-end encryption service invokes the encryptor to generate key agreement data of current key agreement.

In step C6, the encryptor generates a public key (pubkey) and a first random number (random), and the encryptor may further generate a public key index value (pubkeyIndex), where the public key index value (pubkeyIndex) uniquely corresponds to the public key (pubkey), and the public key (pubkey), the first random number (pubkey), and the public key index value (pubkeyIndex) may be used as ciphertext data.

In step C7, the encryptor feeds back the ciphertext data to the end-to-end encryption service.

In step C8, the end-to-end encryption service generates a session identifier and constructs a mapping relationship between the session identifier, the public key index value (pubkeyIndex), the public key (pubkey), and the first random number (random), and may use the session identifier, the public key (pubkey), and the first random number (random) as the key agreement data.

In step C9, the end-to-end encryption service returns the key agreement data to the previous identity authorization service.

In step C10, the previous identity authorization service returns the key agreement data to the application server of the third-party application.

In step C11, the application server of the third-party application returns the key agreement data to the page or the client of the third-party application.

In step C12, the page or the client of the third-party application invokes the end-to-end client to set the key agreement data. The end-to-end client locally generates a second random number (challenge), so that the information may be encrypted by using the public key (pubkey) and the first random number (random) included in the key agreement data.

In step C13, the end-to-end client temporarily stores the key agreement data for use in subsequent interaction.

In addition, the manner of performing key agreement between an end-to-end client and a verification server is described in this embodiment of the disclosure. In such a manner, key agreement data is obtained based on a key agreement process, so that sensitive information of the user may be encrypted by using the key agreement data. In this way, the sensitive information may not be exposed to the third-party application, and secure transmission and storage of the sensitive information of the user are achieved by using an end-to-end encryption technology. In addition, the whole process is non-perceptual for the user and has better experience.

In an example embodiment, based on the embodiment corresponding to FIG. 3, in another optional embodiment provided in the embodiments of the disclosure, the ciphertext data further includes a public key index value, the public key index value uniquely corresponding to the public key;
the generating, by the verification server, the key agreement data according to the public key and the first random number included in the ciphertext data may include:
generating, by the verification server, a session identifier according to the identifier of the target user included in the key agreement request; and
generating, by the verification server, the key agreement data according to the session identifier, the public key, and the first random number; and
further including:
establishing, by the verification server, a mapping relationship between the session identifier, the public key, the first random number, and the public key index value.

Correspondingly, step 104 of performing, by the verification server, decryption processing on the to-be-verified ciphertext information transmitted by the terminal device, to obtain a first information digest may include:
performing, by the verification server based on the mapping relationship and according to the session identifier, decryption processing on the to-be-verified ciphertext information transmitted by the terminal device, to obtain the first information digest.

A manner of implementing password verification on a verification server side is described in this embodiment. Based on the ciphertext generation request, the encryptor may not only generate a public key (pubkey) and a first random number (random), but also generate a public key index value (pubkeyIndex) uniquely corresponding to the public key (pubkey), so that the public key (pubkey), the first random number (random), and the public key index value (pubkeyIndex) may be used as the ciphertext data. The verification server may further generate a session identifier corresponding to the target user according to the identifier of the target user included in the key agreement request, and use the session identifier, the public key (pubkey), and the first random number (random) may be used as the key agreement data.

In an embodiment, for ease of subsequent verification, the verification server may construct a mapping relationship between the session identifier, the public key (pubkey), the first random number (random), and the public key index value (pubkeyIndex), to quickly find an association relationship between such data. That is, the verification server may find the corresponding public key (pubkey), first random number (random), and public key index value (pubkeyIndex) according to the session identifier based on the mapping relationship, so that the verification server may perform decryption processing on the to-be-verified ciphertext information transmitted by the terminal device, to obtain the first information digest.

It would be understood that, the verification server may store the session identifier, the public key (pubkey), the first random number (random), and the public key index value (pubkeyIndex) in the database or the encryptor or a memory blockchain.

The blockchain is a new application mode of computer technologies such as distributed data storage, point-to-point transmission, a consensus mechanism, and an encryption algorithm. The blockchain is essentially a decentralized database and a series of associated data blocks generated in a cryptographic manner. Each data block includes information about a batch of network transactions for verifying the validity of the information (for anti-counterfeiting) and generating a next block. The blockchain may include a blockchain underlying platform, a platform product service layer, and an application service layer.

The blockchain underlying platform may include processing modules such as a user management module, a basic service module, an intelligent contract module, and an operation supervision module. A user management module is responsible for identity information management of all blockchain participants, including maintenance of public and private key generation (account management), key management, maintenance of a correspondence between a user's real identity and a blockchain address (authority management), and the like, and supervising and auditing some real identity transactions under the premise of authorization, and providing rule configuration for risk control (risk control audit). The basic service module is deployed on all blockchain node devices and configured to verify the validity of a service request, and after a consensus is reached on a valid request, record the valid request in storage. For a new service request, the basic service module first parses interface adaptation and performs authentication processing (interface adaptation), then encrypts service information by using a consensus algorithm (consensus management), transmits the complete and consistent service information after encryption to a shared ledger (network communication), and performs recording and storing. The intelligent contract module is responsible for contract registration and publication, contract triggering, and contract execution. A developer may define contract logic by using a programming language, and release the contract logic onto a blockchain (contract registration). According to the logic of contract items, a key or another event is invoked to trigger execution, to complete the contract logic. The function of upgrading or canceling a contract is further provided. The operation supervision module is mainly responsible for deployment, configuration modification, contract setting, and cloud adaptation during product releasing and visualized output of a real-time status during product operation, for example, alarming, monitoring network conditions, and monitoring a health status of a node device.

The platform product service layer provides basic capabilities and an implementation framework of a typical application. Based on these basic capabilities, developers may superpose characteristics of services and complete blockchain implementation of service logic. The application service layer provides a blockchain solution-based application service for use by a service participant.

In addition, the manner of implementing password verification on a verification server side is described in this embodiment pf the disclosure. In such a manner, user identity verification may be implemented without displaying to-be-verified information in a form of plaintext. That is, the verification server may only obtain the first information digest of the to-be-verified information, so that the security of verification is further improved.

In an example embodiment, based on the embodiment corresponding to FIG. 3, in another optional embodiment provided in the embodiments of the disclosure, the performing, by the verification server based on the mapping relationship and according to the session identifier, decryption processing on the to-be-verified ciphertext information transmitted by the terminal device, to obtain the first information digest may include:

obtaining, by the verification server, the public key index value from a database based on the mapping relationship and according to the session identifier;

transmitting, by the verification server, the public key index value to the encryptor, so that the encryptor determines the public key according to the public key index value; and invoking, by the verification server, the encryptor to perform decryption processing on the to-be-verified ciphertext information, to obtain the first information digest, the first information digest being obtained by the encryptor by performing decryption processing on the to-be-verified ciphertext information by using a private key corresponding to the public key.

A manner of obtaining a first information digest on a verification server side is described in this embodiment. As may be seen from the foregoing embodiments, the to-be-verified ciphertext information is a "digital envelope", and a process of decrypting the to-be-verified ciphertext information is described below.

Figure 7:
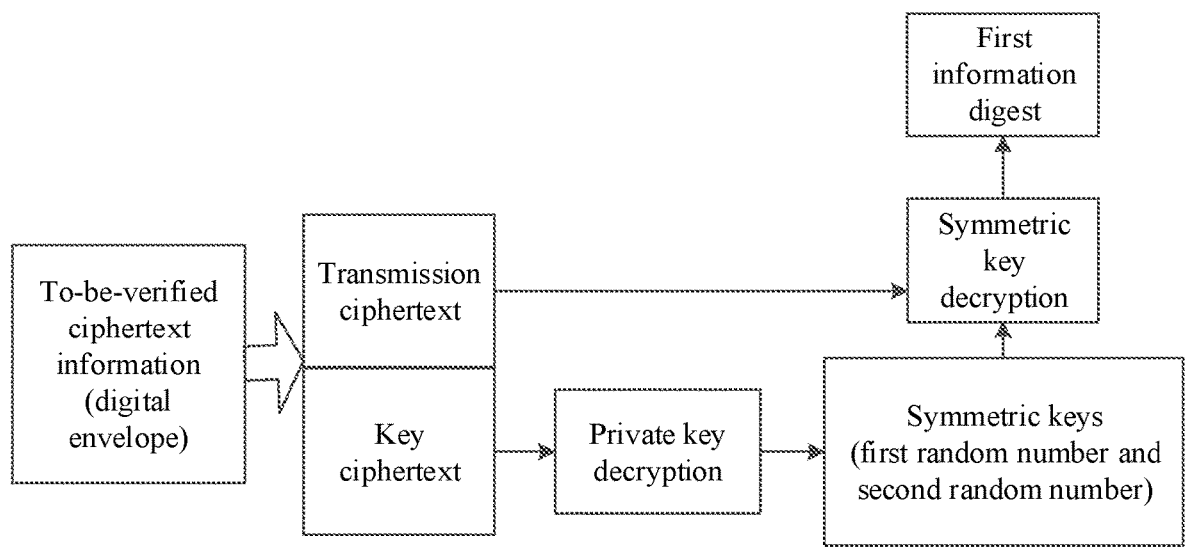
FIG. 7 is a schematic diagram of decrypting to-be-verified ciphertext information according to an embodiment of the disclosure.

FIG. 7 is a schematic diagram of decrypting to-be-verified ciphertext information according to an embodiment of the disclosure. As shown in the figure, the to-be-verified ciphertext information includes key ciphertexts (saeskey) of symmetric keys and a transmission ciphertext (spassword), that is, the to-be-verified ciphertext information is spassword+saeskey, where spassword=AES (challenge+random, SHA256(password)). The key ciphertexts (saeskey) are obtained by performing encryption processing on the symmetric keys (random+challenge) by using the public key (pubkey).

In a scenario corresponding to FIG. 7, the to-be-verified ciphertext information is generated by the terminal device according to the key ciphertexts and the transmission ciphertext. Correspondingly, a manner of obtaining a first information digest on a verification server side is described in this embodiment of the disclosure.

In an example embodiment, step 104 includes:
performing decryption processing on the key ciphertext by using a private key corresponding to the public key, to obtain the first random number and the second random number that are used as symmetric keys; and
performing decryption processing on the transmission ciphertext by using the symmetric keys, to obtain the first information digest.

In other words, the to-be-verified ciphertext information is generated according to the key ciphertexts and the transmission ciphertext. The verification server first searches the database for a public key index value (pubkeyIndex) corresponding to a session identifier based on the mapping relationship, and transmits the public key index value (pubkeyIndex) to the encryptor, so that the encryptor finds a corresponding public key (pubkey) according to the public key index value (pubkeyIndex), and further obtains a private key corresponding to the public key (pubkey). Then, the encryptor decrypts the key ciphertexts (saeskey) by using the private key, to obtain symmetric keys (random+challenge). The transmission ciphertext (spassword) is decrypted by using the symmetric keys (random+challenge), so that a first information digest (SHA256(password)) is obtained.

Further, the manner of obtaining a first information digest on a verification server side is described in this embodiment of the disclosure. In such a manner, the verification server invokes the encryptor to decrypt the to-be-verified ciphertext information. In other words, the public key is stored in an encryptor with higher security, thereby improving the security of information decryption.

In an example embodiment, based on the embodiment corresponding to FIG. 3, in another optional embodiment provided in the embodiments of the disclosure, before the matching, by the verification server, the first information digest with a second information digest, to obtain an information verification result, the method may further include:

obtaining, by the verification server, a key index value and to-be-matched ciphertext information from a database;

transmitting, by the verification server, the key index value and the to-be-matched ciphertext information to the encryptor, so that the encryptor determines an information encryption key according to the key index value; and invoking, by the verification server, the encryptor to perform decryption processing on the to-be-matched ciphertext information, to obtain the second information digest, the second information digest being obtained by the encryptor by performing decryption processing on the to-be-matched ciphertext information by using the information encryption key.

A manner of obtaining a second information digest on a verification server side is described in this embodiment. The verification server further needs to obtaining a second information digest before comparing the first information digest with the second information digest. In an implementation, the second information digest may be stored in the database, so that comparison may be directly performed when needed. In another implementation, the second information digest may be obtained through decryption. A manner of obtaining a second information digest through decryption is described below.

In an embodiment, the verification server searches the database for a key index value (passwordKeyIndex) and to-be-matched ciphertext information (encPassword) corresponding to a session identifier, and then the verification server transmits the key index value (passwordKeyIndex) and the to-be-matched ciphertext information (encPassword) to the encryptor. Based on this, the encryptor first determines information encryption key (passwordKey) according to the key index value (passwordKeyIndex). Then, the verification server invokes the encryptor to decrypt the to-be-matched ciphertext information to obtain the second information digest. The second information digest is represented as SHA256(password_logon), where password_logon is the user information filled in by the user during registration, for example, the user account number, the user password, the mobile phone number, and the like. It would be understood that, the to-be-matched ciphertext information (encPassword) is obtained in the following manner:

encPassword=AES(passwordKey,SHA256(password_logon)), where since the information encryption key (passwordKey) is stored in the encryptor, actual calculation logic is:

encPassword=AES(passwordKeyIndex,SHA256(password_logon)); and reading the information encryption key (passwordKey) from the inside of the encryptor after the key index value (passwordKeyIndex) is obtained by the encryptor, and then performing encryption or decryption processing.

In addition, the manner of obtaining a second information digest on a verification server side is described in this embodiment of the disclosure. In such a manner, the verification server invokes the encryptor to decrypt the to-be-matched ciphertext information. In other words, the information encryption key is stored in an encryptor with higher security, thereby improving the security of information decryption.

In an example embodiment, based on the embodiment corresponding to FIG. 3, in another optional embodiment provided in the embodiments of the disclosure, after the matching, by the verification server, the first information digest with a second information digest, to obtain an information verification result, the method may further include:

generating, by the verification server, a token in a case that the information verification result indicates that verification succeeds, a preset usage cycle being set for the token;

transmitting, by the verification server, the token to the terminal device;

obtaining, by the verification server in a case that an application login request transmitted by the terminal device is received, a usage time of the token in response to the application login request, the application login request carrying the token; and transmitting, by the verification server, an application login success message to the terminal device in a case that the usage time of the token is within the preset usage cycle.

A manner of issuing a token to an end-to-end client by a verification server is described in this embodiment. In a case that the information verification result indicates that verification succeeds, the verification server may further generate a token and issue the token to the end-to-end client deployed on the terminal device. In a case that the target user logs in to the target application again, the token may be directly used, but the verification server needs to verify whether the token has expired. Assuming that a preset usage cycle of the token is from Feb. 1, 2021 to Apr. 1, 2021, the application server of the third-party application may be logged in to by using the token during such a time period.

Figure 8:
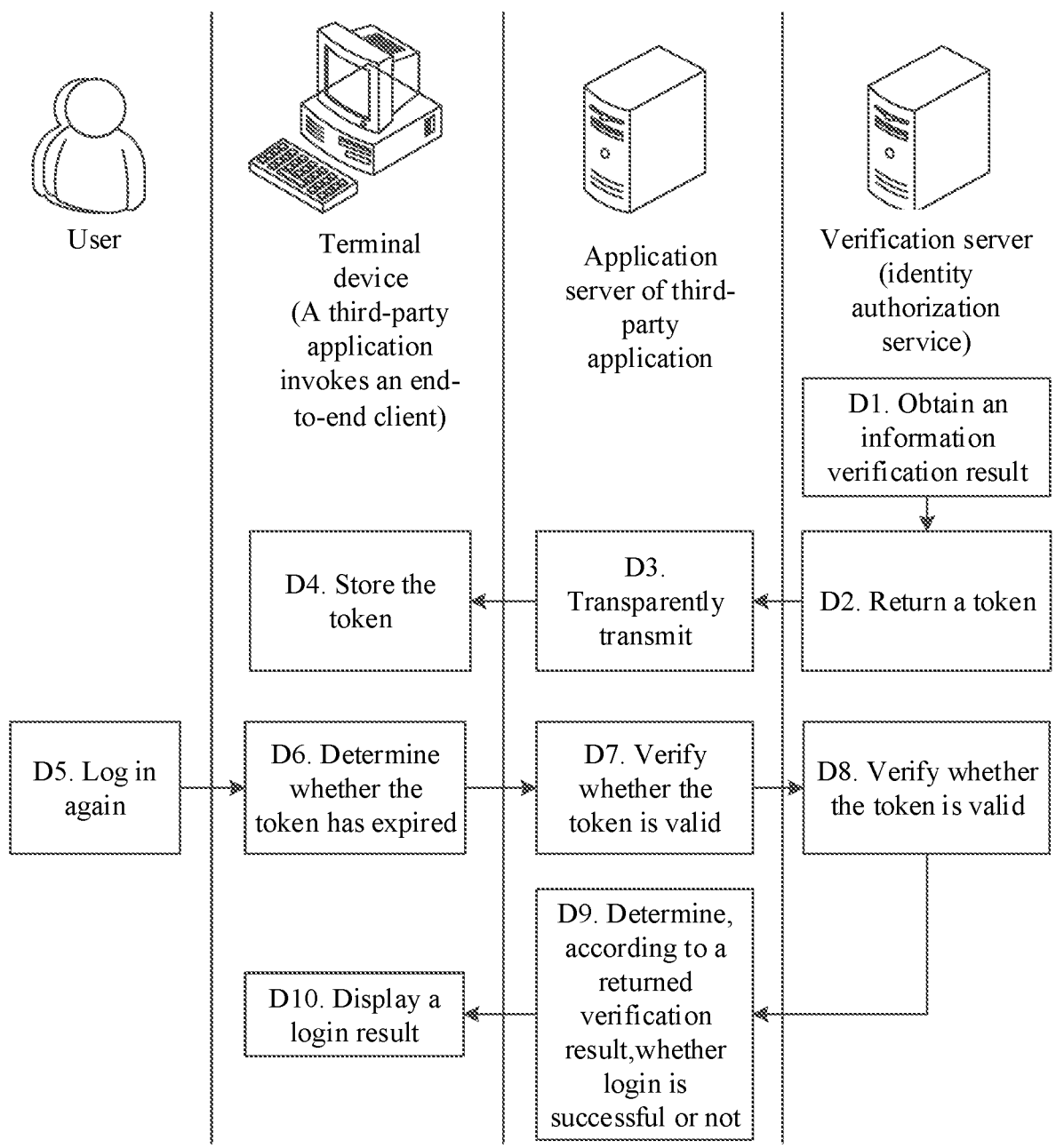
FIG. 8 is a schematic flowchart of token verification according to an embodiment of the disclosure.

For ease of understanding, a token verification process is described below with reference to FIG. 8. FIG. 8 is a schematic flowchart of token verification according to an embodiment of the disclosure. As shown in the figure, the process may include the following steps D1-D10:

In step D1, the verification server obtains an information verification result.

In step D2, the verification server generates a token in a case that the information verification result is that verification succeeds.

In step D3, the verification server transparently transmits the token to the application server of the third-party application, and the application server receives the token from the end-to-end client deployed on the terminal device.

In step D4, the end-to-end client locally stores the token in the terminal device.

In step D5, the target user opens the third-party application again and performs verification by directly using the token.

In step D6, the end-to-end client determines whether the token has expired, and the token is transmitted to the application server of the third-party application in a case that the token does not expire.

In step D7, the application server verifies whether the token is valid, and the token is transmitted to the verification server in a case that the token is verified to be valid.

In step D8, the verification server verifies whether the token is valid and feeds back a verification result to the application server.

In step D9, the application server determines whether login of the target user is successful according to the returned verification result.

In step D10, a login result is displayed through the end-to-end client deployed on the terminal device.

In addition, the manner of issuing a token to an end-to-end client by a verification server is described in this embodiment of the disclosure. In such a manner, the user may continue to use the token for login after succeeding in verification, thereby reducing the risk of exposing the user information. Further, the user may perform verification without jumping to an identity authorization server, and front-end docking logic is not required for docking the third-party application with the identity authorization service, thereby reducing the docking process.

In an example embodiment, based on the embodiment corresponding to FIG. 3, in another optional embodiment provided in the embodiments of the disclosure, before the obtaining, by the verification server, key agreement data in response to a key agreement request transmitted by a terminal device, the method may further include:

receiving, by the verification server in a case that the terminal device enables the target application, an authentication request transmitted by the application server, the authentication request carrying an application key index and an application key;

performing, by the verification server, verification processing on the application key index and the application key in response to the authentication request, to obtain a verification result; and performing, by the verification server in a case that the verification result is that verification succeeds, the operation of obtaining key agreement data in response to a key agreement request transmitted by a terminal device.

A manner of authenticating a third-party application by a verification server is described in this embodiment. A page or client of the third-party application transmits an HTTPS request to the application server of the third-party application after the target user opens the page or the client of the third-party application. The application server invokes an application programming interface (API) of the verification server, where a precondition for invoking is that a developer of the third-party application applies to the verification server for an application key index (AppKey) and an application key (AppSecret) for docking in advance, and the verification server may authenticate through the application key index (AppKey) and the application key (AppSecret).

In an embodiment, after opening the page or the client of the third-party application, the target user transmits an authentication request to the verification server through the application server of the third-party application. The authentication request carries an application key index (AppKey) and an application key (AppSecret). In an example embodiment, the authentication request may further carry a target application and an application identifier (AppID). The application identifier (AppID) is a unique identifier of the target application, the application key index (AppKey) is equivalent to an account assigned by the verification server to the application server, and the application key (App Secret) a password assigned by the verification server to the application server. Based on this, the verification server verifies whether there are records of the application key index (AppKey) and the application key (AppSecret) in the database. In a case that there are records, it indicates that the verification result is that verification succeeds. Therefore, the verification server may perform subsequent operations.

In addition, the manner of authenticating a third-party application by a verification server is described in this embodiment of the disclosure. In such a manner, the verification server further needs to authenticate the third-party application before verifying the user identity, thereby improving the security of data interaction.

In an example embodiment, based on the embodiment corresponding to FIG. 3, in another optional embodiment provided in the embodiments of the disclosure, before the obtaining, by the verification server, key agreement data in response to a key agreement request transmitted by a terminal device, the method may further include:
  receiving, by the verification server in a case that the terminal device enables the target application, an authentication request transmitted by the application server, the authentication request carrying an application key index, a timestamp, a signature random number, and first signature information, the first signature information being obtained by signing a first application key, the timestamp, and the signature random number based on a hash function encryption algorithm;
  obtaining, by the verification server, a second application key in response to the authentication request and according to the application key index;
  signing, by the verification server, the second application key, the timestamp, and the signature random number based on the hash function encryption algorithm, to obtain second signature information; and
  performing, by the verification server in a case that the first signature information and the second signature information are successfully matched, the operation of obtaining key agreement data in response to a key agreement request transmitted by a terminal device.

Another manner of authenticating a third-party application by a verification server is described in this embodiment. A page or client of the third-party application transmits an HTTPS request to the application server of the third-party application after the target user opens the page or the client of the third-party application. The application server invokes an API of the verification server, where a precondition for invoking is that a developer of the third-party application applies to the verification server for an application key index (AppKey) and a first application key (App Secret) for docking in advance, and the verification server may authenticate through the application key index (AppKey) and the first application key (App Secret).

In an embodiment, after opening the page or the client of the third-party application, the target user transmits an authentication request to the verification server through the application server of the third-party application. The authentication request carries an application key index (AppKey), a timestamp, a signature random number, and first signature information, where the first signature information is obtained by the application server by signing the first application key (AppSecret), the timestamp, and the signature random number based on a hash function encryption algorithm. The hash function encryption algorithm includes, but is not limited to, a Secure Hash Algorithm 1 (SHA1), a Secure Hash Algorithm 256 (SHA256), and the like.

The application key index (AppKey) is equivalent to an account assigned by the verification server to the application server, and the first application key (AppSecret) a password assigned by the verification server to the application server. In view of this, based on the application key index (AppKey), the verification server searches for a second application key (AppSecret) corresponding to the application key index (AppKey), so that the second application key (App Secret), the timestamp, and the signature random number are signed based on the hash function encryption algorithm, to obtain the second signature information. Finally, the local second signature information is compared with the received first signature information, and the first signature information and the second signature information are successfully matched in a case that comparison results are consistent, so that the verification server may perform subsequent operations.

In addition, the another manner of authenticating a third-party application by a verification server is described in this embodiment of the disclosure. In such a manner, the verification server further needs to authenticate the third-party application before verifying the user identity, thereby improving the security of data interaction.

Figure 9:
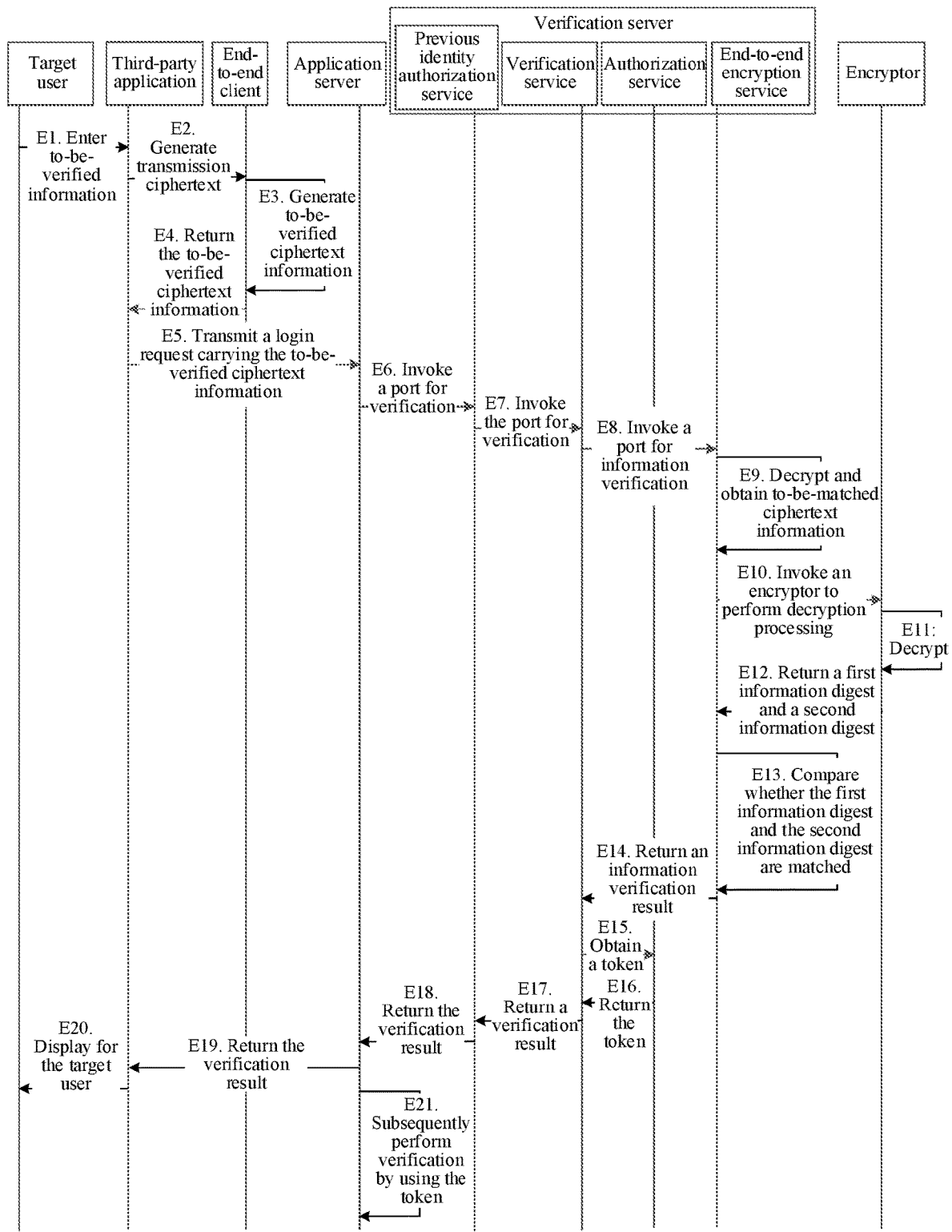
FIG. 9 is a schematic diagram of an overall process of information verification and token issuance according to an embodiment of the disclosure.

With reference to the foregoing embodiments and for ease of understanding, refer to FIG. 9. FIG. 9 is a schematic diagram of an overall process of information verification and token issuance according to an embodiment of the disclosure. As shown in the figure, the process may include E1-E20, as follows:

In step E1, the target user performs a login operation and enters to-be-verified information, for example, a user name, a password, and the like.

In step E2, the third-party application invokes the end-to-end client, so that the end-to-end client generates a second random number (challenge), and use a first random number (random) and the second random number (challenge) as symmetric keys used by a symmetric encryption algorithm. The symmetric keys (random+challenge) are encrypted by using the public key (public key) based on an asymmetric encryption algorithm, to obtain key ciphertexts (saeskey) of the symmetric keys. The end-to-end client deployed on the terminal device further needs to perform digest calculation on the to-be-verified information based on the hash function encryption algorithm, to obtain a first information digest (SHA256(password)). The end-to-end client performs encryption processing on the symmetric keys and the first information digest based on the symmetric encryption algorithm, to obtain a transmission ciphertext (spassword).

spassword=AES(challenge+random,SHA256(password)).

In step E3, the end-to-end client generates to-be-verified ciphertext information, the to-be-verified ciphertext information including a transmission ciphertext (spassword) and key ciphertexts (saeskey).

In step E4, the end-to-end client returns the to-be-verified ciphertext information to the third-party application.

In step E5, the third-party application carries the to-be-verified ciphertext information in a login request and transmits the request to the application server of the third-party application.

In step E6, the application server of the third-party application invokes an API for a previous identity authorization service in the verification server.

In step E7, the previous identity authorization service invokes an API for a verification service.

In step E8, the verification service first verifies whether the target user exists and verifies whether the target user is a user in a normal state in the system, then reads a session identifier (sessionID) from the database in a case that verification succeeds, and transmits a request to an end-to-end encryption service through the session identifier (sessionID).

In step E9, the end-to-end encryption service obtains a public key index value (pubkeyIndex) stored in the database through the session identifier (sessionID), and may further obtain a key index value (passwordKeyIndex) and to-be-matched ciphertext information (encPassword).

In step E10, the end-to-end encryption service invokes the encryptor for decryption.

In step E11, the encryptor performs decryption.

In step E12, the end-to-end encryption service obtains decrypted symmetric keys (random+challenge) and further obtains a first information digest (SHA256(password)), and obtains a second information digest (SHA256(password_logon)) by decrypting according to data in the database.

In step E13, the end-to-end encryption service compares whether the first information digest (SHA256(password)) and the second information digest (SHA256(password_logon)) are consistent, to obtain an information verification result.

In step E14, the end-to-end encryption service returns the information verification result to the verification service.

In step E15, the verification service invokes the authentication service according to the information verification result to obtain a token of the user access authorization.

In step E16, the token generated by the authentication service is returned to the verification service.

In step E17, the verification service returns the information verification result to the previous identity authorization service.

In step E18, the previous identity authorization service returns the information verification result to the application server of the third-party application.

In step E19, the application server of the third-party application returns the verification result to the third-party application.

In step E20, the target user acquires the information verification result.

In step E21, the token may be used for identity verification in a case that the target user subsequently logs in to the third-party application (that is, the target application), unless the token expires and cannot be used.

Figure 10:
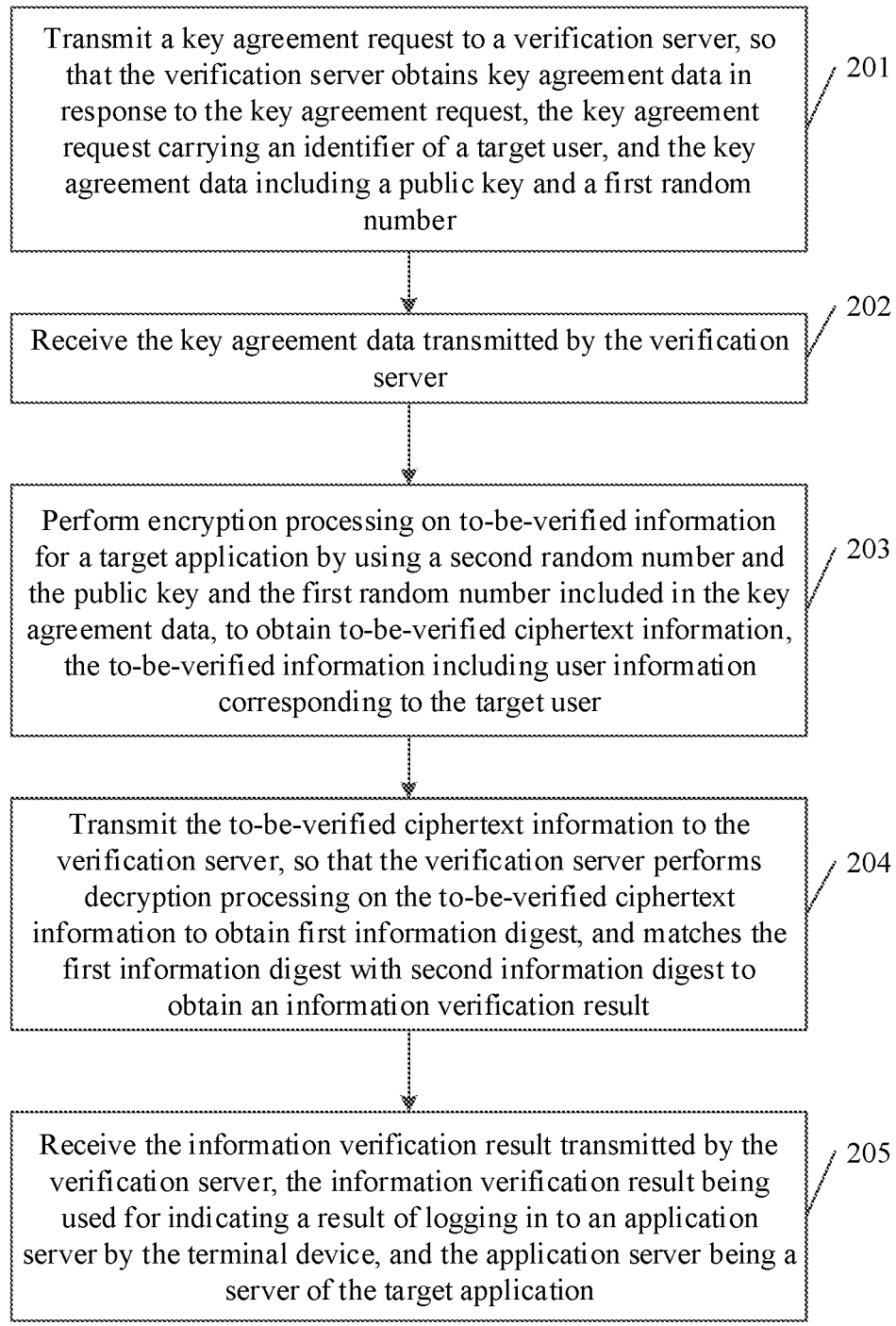
FIG. 10 is a schematic diagram of another embodiment of an information verification method according to the embodiments of the disclosure.

The information verification method provided in the disclosure is described below with reference to the foregoing description from the perspective of the terminal device. FIG. 10 is a schematic diagram of another embodiment of an information verification method according to the embodiments of the disclosure. Referring to FIG. 10, an embodiment of the information verification method may include 201-205:

201. The terminal device transmits a key agreement request to a verification server, so that the verification server obtains key agreement data in response to the key agreement request, the key agreement request carrying an identifier of a target user, and the key agreement data including a public key and a first random number;

In an example embodiment, the public key and the first random number are generated by an encryptor.

In this embodiment, the target user may automatically pull up an end-to-end client when enabling a third-party application on the terminal device, so that the terminal device transmits the key agreement request to the verification server through the end-to-end client. The key agreement request carries the identifier of the target user. Based on this, the verification server may establish a session to communicate with the terminal device. The verification server invokes the encryptor according to the key agreement request, to generate the key agreement data required for current key agreement. In other words, the encryptor generates the key agreement data and feeds back the data to the verification server. The key agreement data includes a public key (pubkey) and a first random number (random). The first random number (random) may be a random number consists of ASCII.

202. The terminal device receives the key agreement data transmitted by the verification server.

In this embodiment, the verification server transmits the key agreement data to the terminal device, and the end-to-end client deployed on the terminal device receives the key agreement data.

203. The terminal device performs encryption processing on to-be-verified information for a target application by using a second random number and the public key and the first random number included in the key agreement data, to obtain to-be-verified ciphertext information, the to-be-verified information including user information corresponding to the target user.

In an example embodiment, the second random number is generated by the terminal device.

In this embodiment, the terminal device generates the second random number (challenge) based on the end-to-end client, so that the terminal device performs encryption processing on to-be-verified information entered by the target user by using a second random number (challenge) and the public key (pubkey) and the first random number (random) included in the key agreement data, to obtain the to-be-verified ciphertext information, where the second random number (challenge) may be a random number consists of ASCII. It would be understood that, in a case that the target user intends to log in to a third-party application, user information required for logging in to the target application needs to be entered, that is, to-be-verified information, where the to-be-verified information includes the user information of the target user, for example, a user name, a user account, a user password, a user mobile phone number, a user mailbox, and a user ID number. This is not limited herein.

In an embodiment, the to-be-verified ciphertext information is a "digital envelope". The "digital envelope" is a method for delivering symmetric keys through an asymmetric encryption result, which is a technology to achieve information confidentiality verification. A message (where the message is similar to content on stationery) is encrypted by using a symmetric encryption algorithm, the symmetric keys (which is similar to an envelope) are encrypted by using an asymmetric encryption algorithm, and the envelope wraps the stationery, thereby ensuring security of the message.

204. The terminal device transmits the to-be-verified ciphertext information to the verification server, so that the verification server performs decryption processing on the to-be-verified ciphertext information to obtain first information digest, and matches the first information digest with second information digest to obtain an information verification result.

In this embodiment, the terminal device transmits the to-be-verified ciphertext information and a session identifier (where the session identifier is optional) to the verification server. Since the to-be-verified ciphertext information is encrypted to-be-verified information, the application server of the third-party application cannot directly obtain the to-be-verified information. The session identifier is an identifier of a session, and session is generated on the verification server after every time of visiting the verification server, so that identity verification for the target user may be performed in the same session.

In an embodiment, for example, the verification server may obtain a corresponding public key (pubkey) according to the session identifier, and perform decryption processing on the to-be-verified ciphertext information by using the public key (pubkey), to obtain the first information digest corresponding to the to-be-verified information. Considering that directly decrypting the to-be-verified information is not secure, the first information digest is obtained herein. Therefore, the verification server may not directly obtain the to-be-verified information, but invokes the encryptor to perform decryption processing on the to-be-verified ciphertext information to obtain the first information digest, and obtains a second information digest corresponding to the target user from a database according to the session identifier.

It would be understood that, the target user may fill in corresponding information when registering, for example, a user name, a user account, a user password, a user mobile phone number, a user mailbox, and a user ID number. This is not limited herein. Based on this, the verification server may invoke the encryptor to generate the second information digest corresponding to registration information.

205. The terminal device receives the information verification result transmitted by the verification server, the information verification result being used for indicating a result of logging in to an application server by the terminal device, and the application server being a server of the target application.

In this embodiment, the verification server compares the first information digest with the second information digest to obtain a comparison result. The comparison result is the information verification result. The verification server transmits the information verification result to the terminal device, and then the terminal device may display the information verification result. In an embodiment, in a case that the information verification result indicates that verification succeeds, it indicates that the target user may log in to the application server of the third-party application through the terminal device. In a case that the information verification result indicates that verification fails, it indicates that the target user cannot log in to the application server of the third-party application through the terminal device.

An information verification method is provided in the embodiments of the disclosure. In the foregoing mode, before transmitting the to-be-verified information, the terminal device performs encryption processing on the to-be-verified information by using the random numbers and the public key issued by the verification server, to obtain the to-be-verified ciphertext information, so that the to-be-verified ciphertext information is used throughout transmission. In addition, a server of a third-party application cannot decrypt the to-be-verified information even if the to-be-verified ciphertext information is obtained, and the to-be-verified information may be obtained only by the verification server. In this way, the server of the third-party application may be logged in to without exposing privacy information of a user to the third-party application, thereby improving the security of identity verification.

In an example embodiment, based on the embodiment corresponding to FIG. 3, in another optional embodiment provided in the embodiments of the disclosure, the performing, by the terminal device, encryption processing on to-be-verified information for a target application by using a second random number and the public key and the first random number included in the key agreement data, to obtain to-be-verified ciphertext information may include:

generating, by the terminal device, a second random number;

using, by the terminal device, the first random number and the second random number as symmetric keys used by a symmetric encryption algorithm;

performing, by the terminal device, encryption processing on the symmetric keys by using the public key included in the key agreement data based on an asymmetric encryption algorithm, to obtain key ciphertexts of the symmetric keys;

performing, by the terminal device, digest calculation on the to-be-verified information for the target application based on a hash function encryption algorithm, to obtain the first information digest;

performing, by the terminal device, encryption processing on the symmetric keys and the first information digest based on the symmetric encryption algorithm, to obtain a transmission ciphertext; and generating, by the terminal device, the to-be-verified ciphertext information according to the key ciphertexts and the transmission ciphertext.

A manner of performing encryption processing on to-be-verified information by an end-to-end client by using key agreement data is described in this embodiment. As may be seen from the foregoing embodiments, the to-be-verified ciphertext information is a "digital envelope", and a manner of generating the to-be-verified ciphertext information is described below.

Figure 11:
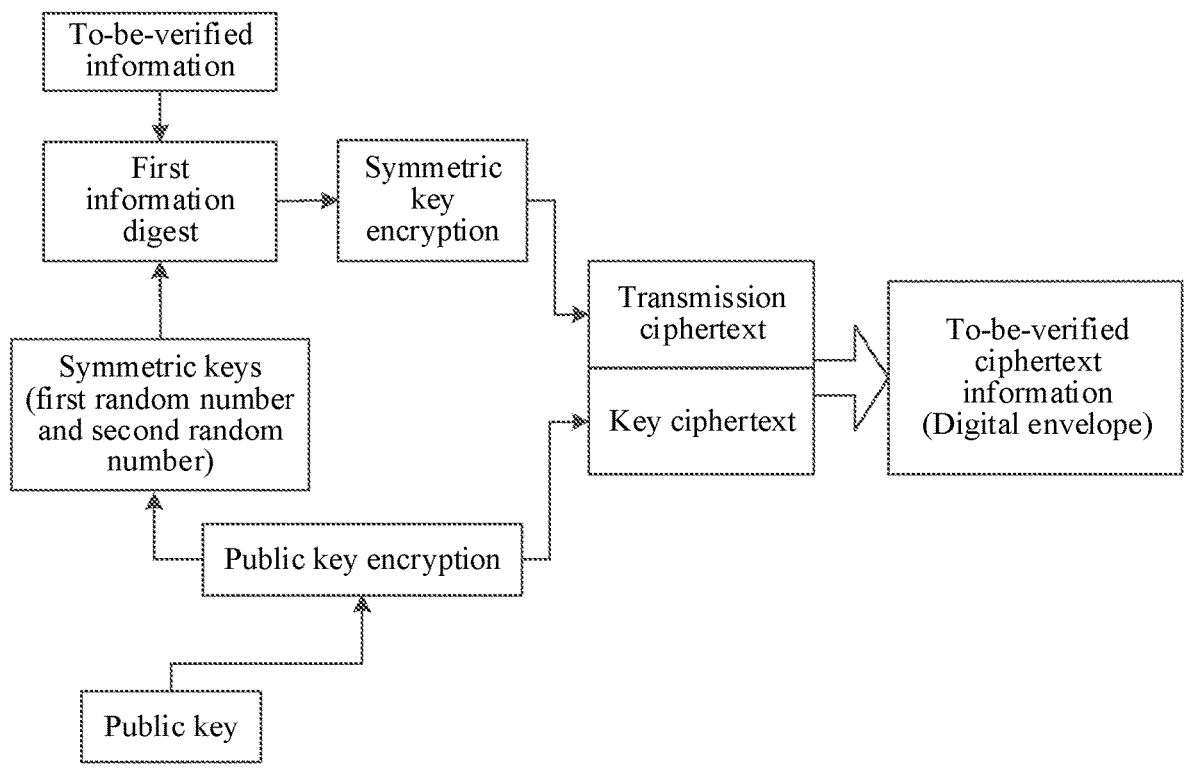
FIG. 11 is a schematic diagram of generating to-be-verified ciphertext information according to an embodiment of the disclosure.

FIG. 11 is a schematic diagram of generating to-be-verified ciphertext information according to an embodiment of the disclosure. As shown in the figure, the end-to-end client deployed on the terminal device generates a second random number (challenge), but the key agreement data transmitted by the verification server includes a public key (pubkey) and a first random number (random). Therefore, the first random number (random) and the second random number (challenge) are used as symmetric keys used by the symmetric encryption algorithm. The symmetric encryption algorithm includes, but is not limited to, an advanced encryption standard (AES) algorithm, a data encryption standard (DES) algorithm, a triple data encryption algorithm (TDEA), and the like. The AES is used as a symmetric encryption algorithm in the disclosure, but this is not to be understood as a limitation of the disclosure.

Based on this, the symmetric keys (random+challenge) are encrypted by using the public key (public key) based on an asymmetric encryption algorithm, to obtain key ciphertexts (saeskey) of the symmetric keys. The end-to-end client deployed on the terminal device further needs to perform digest calculation on the to-be-verified information based on the hash function encryption algorithm, to obtain a first information digest. The hash function encryption algorithm includes, but is not limited to, a SHA1 and a SHA256. The SHA256 is used as a hash function encryption algorithm in the disclosure, but this is not to be understood as a limitation of the disclosure. Therefore, assuming that the to-be-verified information is "password" and the to-be-verified information is in the form of plaintext, the to-be-verified information needs to encrypted. The to-be-verified information is encrypted by using the hash function encryption algorithm, for example, SHA256, so that an obtained first information digest may be represented as SHA256(password).

The end-to-end client performs encryption processing on the symmetric keys and the first information digest based on the symmetric encryption algorithm, to obtain a transmission ciphertext. For example, the symmetric keys and the first information digest are encrypted by using the AES algorithm, to obtain the transmission ciphertext (spassword), that is, spassword=AES(challenge+random,SHA256(password)). Finally, to-be-verified ciphertext information is generated, the to-be-verified ciphertext information including a transmission ciphertext (spassword) and key ciphertexts (saeskey).

Further, the manner of performing encryption processing on to-be-verified information by an end-to-end client by using key agreement data is described in this embodiment of the disclosure. In such a manner, the end-to-end client performs encryption processing on the to-be-verified information by using a locally generated second random number and the key agreement data transmitted by the verification server, and transmits to-be-verified ciphertext information obtained through encryption, thereby improving the security of information transmission.

Figure 12:
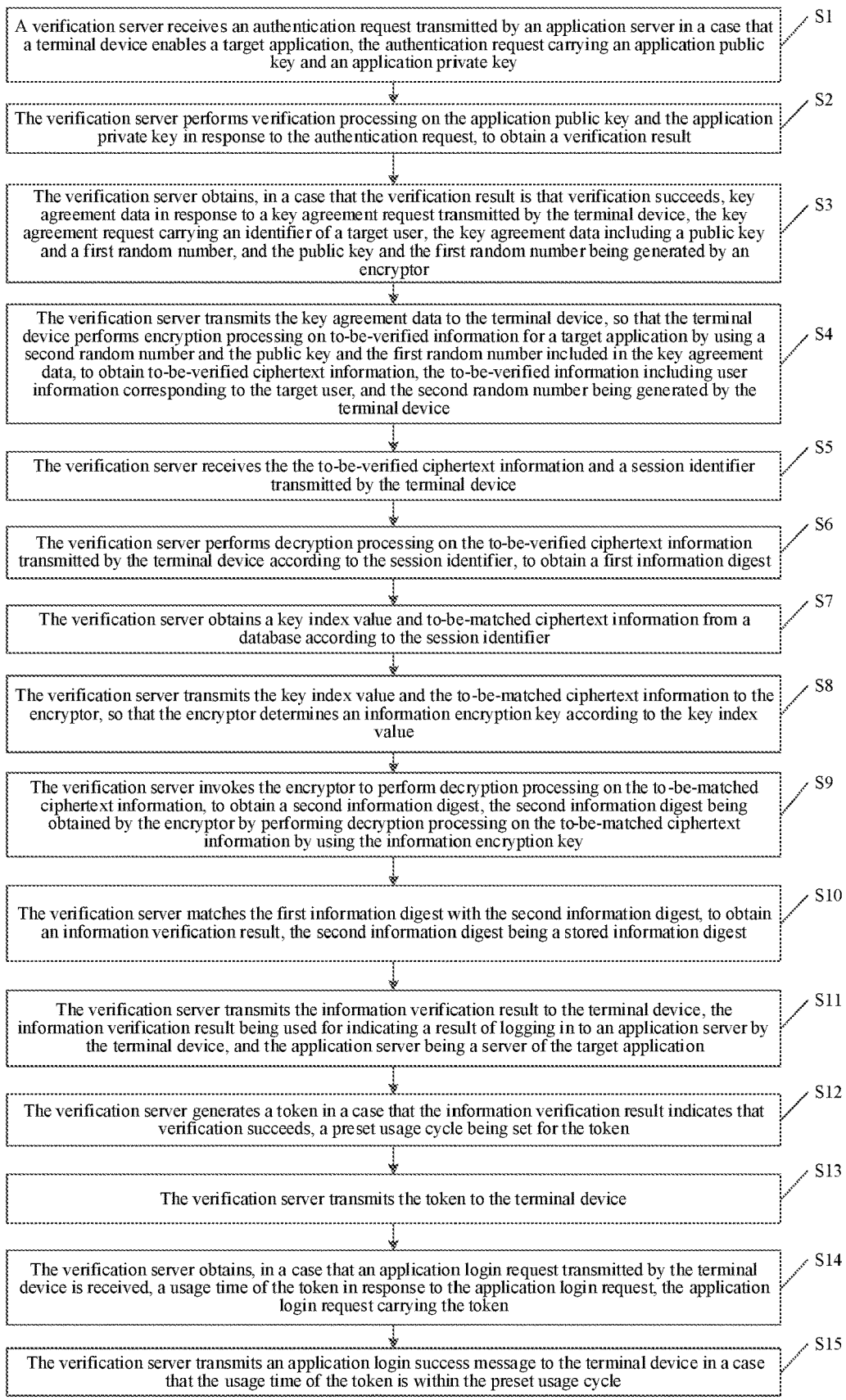
FIG. 12 is a schematic diagram of an overall process of an information verification method according to an embodiment of the disclosure.

An overall process of the information verification method provided in the disclosure is described below with reference to the foregoing embodiments. FIG. 12 is a schematic diagram of an overall process of an information verification method according to an embodiment of the disclosure. As shown in the figure, the process may include the following steps S1-S15:

In step S1, the verification server receives an authentication request transmitted by the application server in a case that the terminal device enables the target application, the authentication request carrying an application key index and an application key.

In step S2, the verification server performs verification processing on the application key index and the application key in response to the authentication request, to obtain a verification result.

In step S3, in a case that the verification result is that verification succeeds, the verification server obtains key agreement data in response to a key agreement request transmitted by a terminal device, the key agreement request carrying an identifier of a target user, the key agreement data including a public key and a first random number, and the public key and the first random number being generated by an encryptor.

In step S4, the verification server transmits the key agreement data to the terminal device, so that the terminal device performs encryption processing on to-be-verified information for a target application by using a second random number and the public key and the first random number included in the key agreement data, to obtain to-be-verified ciphertext information, the to-be-verified information including user information corresponding to the target user, and the second random number being generated by the terminal device.

In step S5, the verification server receives the to-be-verified ciphertext information and a session identifier transmitted by the terminal device.

In step S6, the verification server performs, according to the session identifier, decryption processing on the to-be-verified ciphertext information transmitted by the terminal device, to obtain a first information digest.

In step S7, the verification server obtains a key index value and to-be-matched ciphertext information from a database according to the session identifier.

In step S8, the verification server transmits the key index value and the to-be-matched ciphertext information to the encryptor, so that the encryptor determines an information encryption key according to the key index value.

In step S9, the verification server invokes the encryptor to perform decryption processing on the to-be-matched ciphertext information, to obtain the second information digest, the second information digest being obtained by the encryptor by performing decryption processing on the to-be-matched ciphertext information by using the information encryption key.

In step S10, the verification server matches the first information digest with a second information digest, to obtain an information verification result, the second information digest being a stored information digest.

In step S11, the verification server transmits the information verification result to the terminal device, the information verification result being used for indicating a result of logging in to an application server by the terminal device, and the application server being a server of the target application.

In step S12, the verification server generates a token in a case that the information verification result indicates that verification succeeds, a preset usage cycle being set for the token.

In step S13, the verification server transmits the token to the terminal device.

In step S14, in a case that an application login request transmitted by the terminal device is received, the verification server obtains a usage time of the token in response to the application login request, the application login request carrying the token.

In step S15, the verification server transmits an application login success message to the terminal device in a case that the usage time of the token is within the preset usage cycle.

Figure 13:
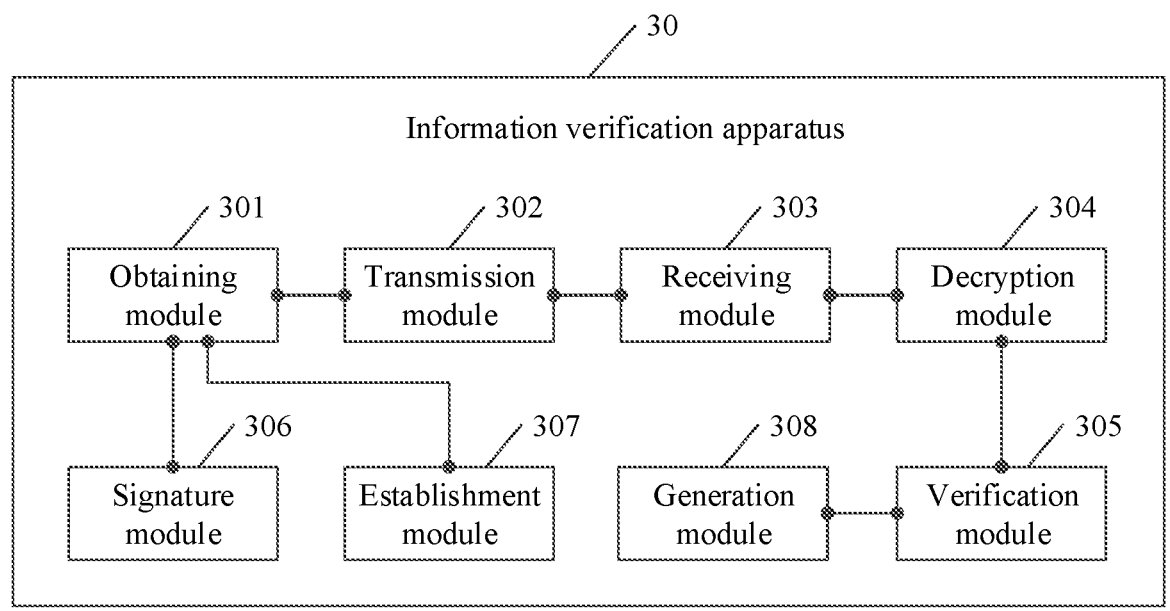
FIG. 13 is a schematic diagram of an information verification apparatus according to an embodiment of the disclosure.

The information verification apparatus provided in the disclosure is described in detail below. FIG. 13 is a schematic diagram of an information verification apparatus according to an embodiment of the disclosure. The information verification apparatus 30 includes:

an obtaining module 301, configured to obtain key agreement data in response to a key agreement request transmitted by a terminal device, the key agreement request carrying an identifier of a target user, and the key agreement data including a public key and a first random number;

a transmission module 302, configured to transmit the key agreement data to the terminal device, so that the terminal device performs encryption processing on to-be-verified information for a target application by using a second random number and the public key and the first random number included in the key agreement data, to obtain to-be-verified ciphertext information, the to-be-verified information including user information corresponding to the target user;

a receiving module 303, configured to receive the to-be-verified ciphertext information transmitted by the terminal device;

a decryption module 304, configured to perform decryption processing on the to-be-verified ciphertext information transmitted by the terminal device, to obtain a first information digest; and a verification module 305, configured to match the first information digest with a second information digest, to obtain an information verification result, the second information digest being a stored information digest, the transmission module 302 being further configured to transmit the information verification result to the terminal device, the information verification result being used for indicating a result of logging in to an application server by the terminal device, and the application server being a server of the target application.

An information verification apparatus is provided in the embodiments of the disclosure. By using the foregoing apparatus, before transmitting the to-be-verified information, the terminal device performs encryption processing on the to-be-verified information by using the random numbers and the public key issued by the verification server, to obtain the to-be-verified ciphertext information, so that the to-be-verified ciphertext information is used throughout transmission. In addition, a server of a third-party application cannot decrypt the to-be-verified information even if the to-be-verified ciphertext information is obtained, and the to-be-verified information may be obtained only by the verification server. In this way, the server of the third-party application may be logged in to without exposing privacy information of a user to the third-party application, thereby improving the security of identity verification.

In an example embodiment, based on the embodiment corresponding to FIG. 13, in another embodiment of the information verification apparatus 30 provided in the embodiments of the disclosure, the receiving module 303 is further configured to, before the obtaining module obtains the key agreement data in response to the key agreement request transmitted by the terminal device, receive an authentication request transmitted by the application server in a case that the terminal device enables the target application, the authentication request carrying an application key index and an application key;

the verification module 305 is further configured to perform verification processing on the application key index and the application key in response to the authentication request, to obtain a verification result; and the obtaining module 301 is further configured to perform, in a case that the verification result is that verification succeeds, the operation of obtaining key agreement data in response to a key agreement request transmitted by a terminal device.

An information verification apparatus is provided in this embodiment of the disclosure. By using the apparatus, the verification server further needs to authenticate the third-party application before verifying the user identity, thereby improving the security of data interaction.

In an example embodiment, based on the embodiment corresponding to FIG. 13, in another embodiment of the information verification apparatus 30 provided in the embodiments of the disclosure, the information verification apparatus 30 further includes a signing module 306;

the receiving module 303 is further configured to, before the obtaining module 301 obtains the key agreement data in response to the key agreement request transmitted by the terminal device, receive an authentication request transmitted by the application server in a case that the terminal device enables the target application, the authentication request carrying an application key index, a timestamp, a signature random number, and first signature information, the first signature information being obtained by signing a first application key, the timestamp, and the signature random number based on a hash function encryption algorithm the obtaining module 301 is further configured to obtain a second application key in response to the authentication request and according to the application key index;

the signing module 306 is configured to sign the second application key, the timestamp, and the signature random number based on the hash function encryption algorithm, to obtain second signature information; and the obtaining module 301 is further configured to perform, in a case that the first signature information and the second signature information are successfully matched, the operation of obtaining key agreement data in response to a key agreement request transmitted by a terminal device.

An information verification apparatus is provided in this embodiment of the disclosure. By using the apparatus, the verification server further needs to authenticate the third-party application before verifying the user identity, thereby improving the security of data interaction.

In an example embodiment, the decryption module 304 is further configured to: perform decryption processing on the key ciphertext by using a private key corresponding to the public key, to obtain the first random number and the second random number that are used as symmetric keys; and perform decryption processing on the transmission ciphertext by using the symmetric keys, to obtain the first information digest.

In an example embodiment, based on the embodiment corresponding to FIG. 13, in another embodiment of the information verification apparatus 30 provided in the embodiments of the disclosure, the obtaining module 301 is further configured to: transmit a ciphertext generation request to an encryptor, so that the encryptor generates ciphertext data in response to the ciphertext generation request, the ciphertext data including the public key and the first random number;

receive the ciphertext data transmitted by the encryptor; and generate the key agreement data according to the public key and the first random number included in the ciphertext data.

An information verification apparatus is provided in this embodiment of the disclosure. By using the foregoing apparatus, key agreement data is obtained based on a key agreement process, so that sensitive information of the user may be encrypted by using the key agreement data. In this way, the sensitive information may not be exposed to the third-party application, and secure transmission and storage of the sensitive information of the user are achieved by using an end-to-end encryption technology. In addition, the whole process is non-perceptual for the user and has better experience.

In an example embodiment, based on the embodiment corresponding to FIG. 13, in another embodiment of the information verification apparatus 30 provided in the embodiments of the disclosure, the ciphertext data further includes a public key index value, the public key index value uniquely corresponding to the public key;

the information verification apparatus 30 further includes an establishment module 307;
the obtaining module 301 is further configured to: generate a session identifier according to the identifier of the target user included in the key agreement request; and
generate the key agreement data according to the session identifier, the public key, and the first random number;
the establishment module 307 is configured to establish a mapping relationship between the session identifier, the public key, the first random number, and the public key index value; and
the decryption module 304 is further configured to perform, based on the mapping relationship and according to the session identifier, decryption processing on the to-be-verified ciphertext information transmitted by the terminal device, to obtain the first information digest.

An information verification apparatus is provided in this embodiment of the disclosure. By using the foregoing apparatus, user identity verification may be implemented without displaying to-be-verified information in a form of plaintext. That is, the verification server may only obtain the first information digest of the to-be-verified information, so that the security of verification is further improved.

In an example embodiment, based on the embodiment corresponding to FIG. 13, in another embodiment of the information verification apparatus 30 provided in the embodiments of the disclosure, the decryption module 304 is further configured to: obtain the public key index value from a database based on the mapping relationship and according to the session identifier;
transmit the public key index value to the encryptor, so that the encryptor determines the public key according to the public key index value; and
invoke the encryptor to perform decryption processing on the to-be-verified ciphertext information, to obtain the first information digest, the first information digest being obtained by the encryptor by performing decryption processing on the to-be-verified ciphertext information by using a private key corresponding to the public key.

An information verification apparatus is provided in this embodiment of the disclosure. By using the foregoing apparatus, the verification server invokes the encryptor to decrypt the to-be-verified ciphertext information. In other words, the public key is stored in an encryptor with higher security, thereby improving the security of information decryption.

In an example embodiment, based on the embodiment corresponding to FIG. 13, in another embodiment of the information verification apparatus 30 provided in the embodiments of the disclosure, the obtaining module 301 is further configured to obtain a key index value and to-be-matched ciphertext information from a database according to the session identifier before the verification module 305 matches the first information digest with a second information digest to obtain an information verification result;

the transmission module 302 is further configured to transmit the key index value and the to-be-matched ciphertext information to the encryptor, so that the encryptor determines an information encryption key according to the key index value; and
the decryption module 304 is further configured to invoke the encryptor to perform decryption processing on the to-be-matched ciphertext information, to obtain the second information digest, the second information digest being obtained by the encryptor by performing decryption processing on the to-be-matched ciphertext information by using the information encryption key.

An information verification apparatus is provided in this embodiment of the disclosure. By using the foregoing apparatus, the verification server invokes the encryptor to decrypt the to-be-matched ciphertext information. In other words, the information encryption key is stored in an encryptor with higher security, thereby improving the security of information decryption.

In an example embodiment, based on the embodiment corresponding to FIG. 13, in another embodiment of the information verification apparatus 30 provided in the embodiments of the disclosure, the information verification apparatus 30 further includes a generation module 308;

the generation module 308 is configured to generate, after the verification module 305 matches the first information digest with the second information digest to obtain the information verification result, a token in a case that the information verification result indicates that verification succeeds, a preset usage cycle being set for the token;
the transmission module 302 is further configured to transmit the token to the terminal device;
the obtaining module 301 is further configured to obtain, in a case that an application login request transmitted by the terminal device is received, a usage time of the token in response to the application login request, the application login request carrying the token; and
the transmission module 302 is further configured to transmit an application login success message to the terminal device in a case that the usage time of the token is within the preset usage cycle.

An information verification apparatus is provided in this embodiment of the disclosure. By using the foregoing apparatus, the user may continue to use the token for login after succeeding in verification, thereby reducing the risk of exposing the user information. Further, the user may perform verification without jumping to an identity authorization server, and front-end docking logic is not required for docking the third-party application with the identity authorization service, thereby reducing the docking process.

Figure 14:
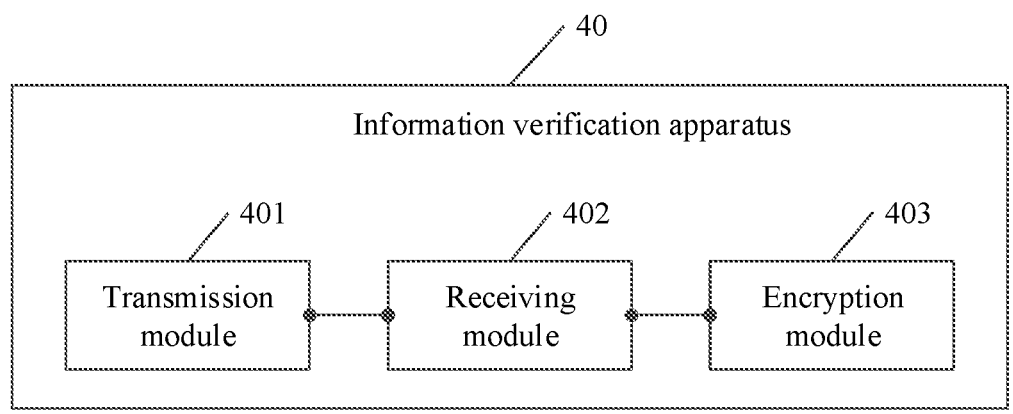
FIG. 14 is another schematic diagram of an information verification apparatus according to an embodiment of the disclosure.

The information verification apparatus provided in the disclosure is described in detail below. FIG. 14 is another schematic diagram of an information verification apparatus according to an embodiment of the disclosure. The information verification apparatus 40 includes:

a transmission module 401, configured to transmit a key agreement request to a verification server, so that the verification server obtains key agreement data in response to the key agreement request, the key agreement request carrying an identifier of a target user, and the key agreement data including a public key and a first random number;
a receiving module 402, configured to receive the key agreement data transmitted by the verification server; and an encryption module 403, configured to perform encryption processing on to-be-verified information for a target application by using a second random number and the public key and the first random number included in the key agreement data, to obtain to-be-verified ciphertext information, the to-be-verified information including user information corresponding to the target user.

The transmission module 401 is further configured to transmit the to-be-verified ciphertext information to the verification server, so that the verification server performs decryption processing on the to-be-verified ciphertext information to obtain first information digest, and matches the first information digest with second information digest to obtain an information verification result, the receiving module 402 is further configured to receive the information verification result transmitted by the verification server, the information verification result being used for indicating a result of logging in to an application server by the terminal device, and the application server being a server of the target application.

An information verification apparatus is provided in the embodiments of the disclosure. By using the foregoing apparatus, before transmitting the to-be-verified information, the terminal device performs encryption processing on the to-be-verified information by using the random numbers and the public key issued by the verification server, to obtain the to-be-verified ciphertext information, so that the to-be-verified ciphertext information is used throughout transmission. In addition, a server of a third-party application cannot decrypt the to-be-verified information even if the to-be-verified ciphertext information is obtained, and the to-be-verified information may be obtained only by the verification server. In this way, the server of the third-party application may be logged in to without exposing privacy information of a user to the third-party application, thereby improving the security of identity verification.

In an example embodiment, based on the embodiment corresponding to FIG. 14, in another embodiment of the information verification apparatus 40 provided in the embodiments of the disclosure, the encryption module 403 is further configured to generate a second random number;
use the first random number and the second random number as symmetric keys used by a symmetric encryption algorithm;
perform encryption processing on the symmetric keys by using the public key included in the key agreement data based on an asymmetric encryption algorithm, to obtain key ciphertexts of the symmetric keys;
perform digest calculation on the to-be-verified information for the target application based on a hash function encryption algorithm, to obtain the first information digest;
perform encryption processing on the symmetric keys and the first information digest based on the symmetric encryption algorithm, to obtain a transmission ciphertext; and
generate the to-be-verified ciphertext information according to the key ciphertexts and the transmission ciphertext.

An information verification apparatus is provided in this embodiment of the disclosure. By using the apparatus, the end-to-end client performs encryption processing on the to-be-verified information by using a locally generated second random number and the key agreement data transmitted by the verification server, and transmits to-be-verified ciphertext information obtained through encryption, thereby improving the security of information transmission.

Figure 15:
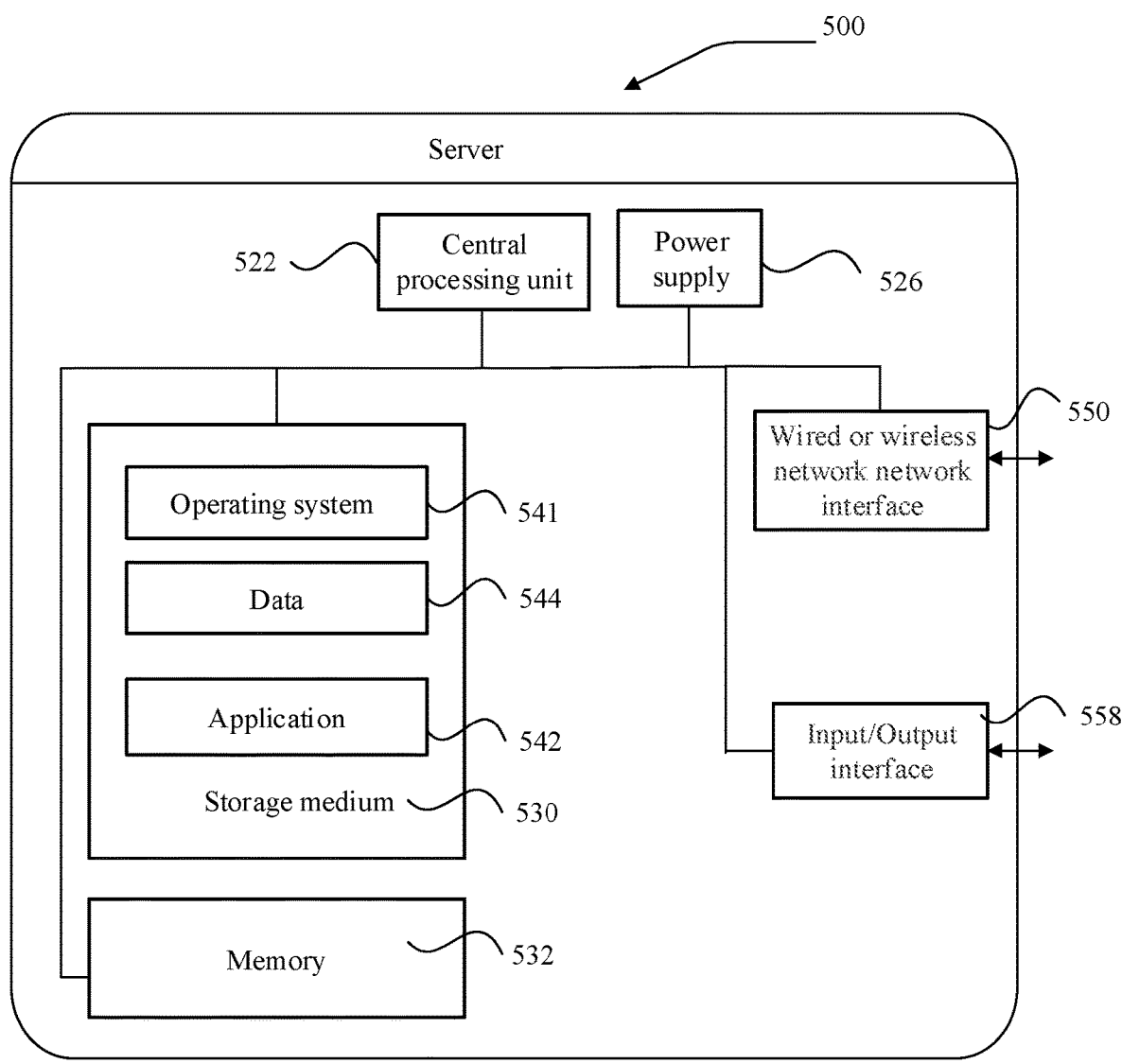
FIG. 15 is a schematic structural diagram of a server according to an embodiment of the disclosure.

An embodiment of the disclosure further provides another information verification apparatus, the information verification apparatus being deployed on the server. FIG. 15 is a schematic structural diagram of a server according to an embodiment of the disclosure. A server 500 may vary greatly due to different configurations or performance, and may include one or more central processing units (CPU) 522 (for example, one or more processors) and a memory 532, and one or more storage media 530 (for example, one or more mass storage devices) that store applications 542 or data 544. The memory 532 and the storage medium 530 may be temporary storage or persistent storage. A program stored in the storage medium 530 may include one or more modules (which are not marked in the figure), and each module may include a series of instruction operations on the server. Furthermore, the central processing unit 522 may be configured to communicate with the storage medium 530 to perform the series of instruction operations in the storage medium 530 on the server 500.

The server 500 may further include one or more power supplies 526, one or more wired or wireless network interfaces 550, one or more input/output interfaces 558, and/or one or more operating systems 541, for example, Windows Server™, Mac OS X™, Unix™ Linux™, or FreeBSD™.

The steps performed by the server in the foregoing embodiment may be based on the server structure shown in FIG. 15.

Figure 16:
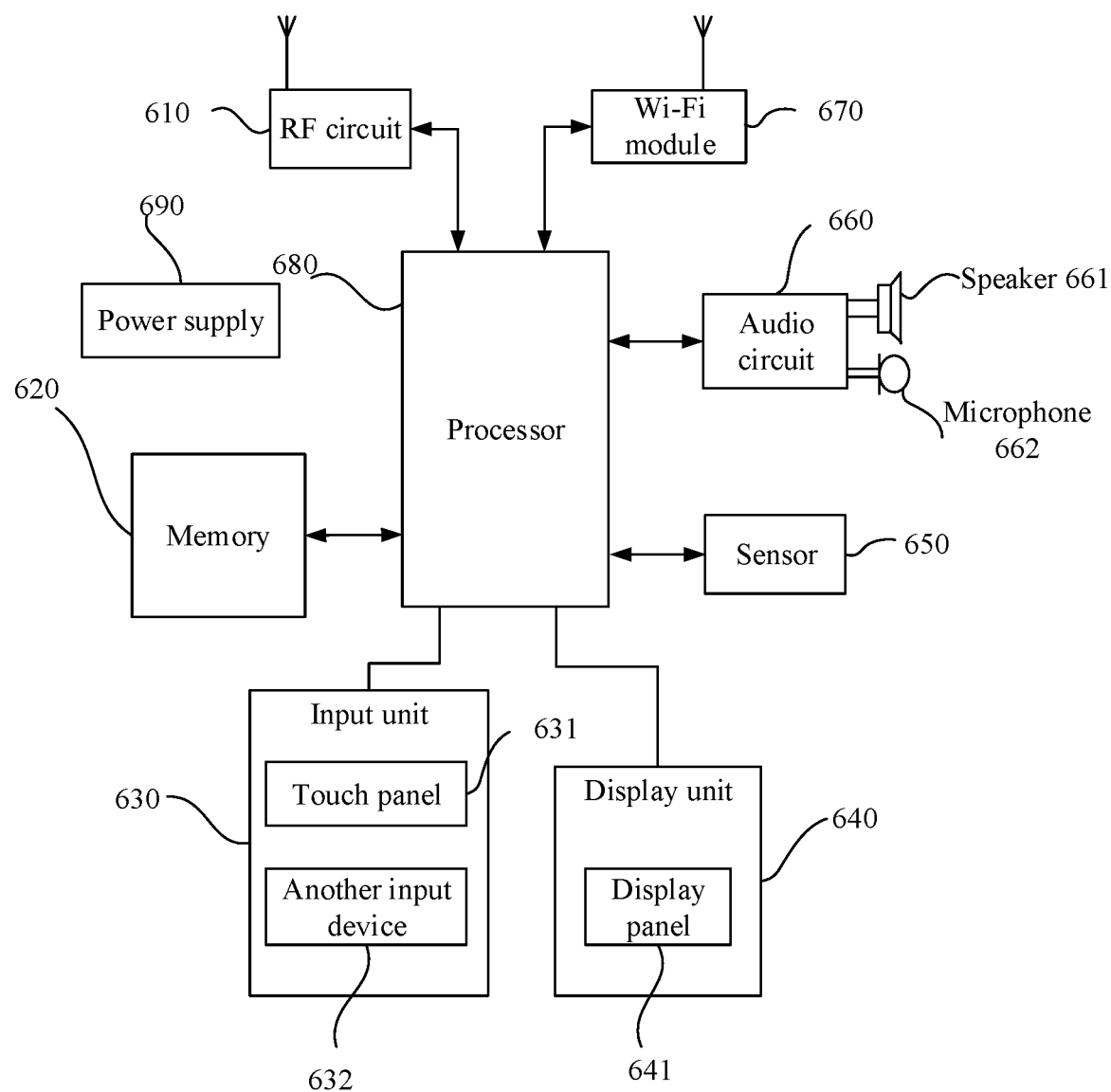
FIG. 16 is a schematic structural diagram of a terminal device according to an embodiment of the disclosure.

An embodiment of the disclosure further provides another information verification apparatus, the information verification apparatus being deployed on the terminal device. As shown in FIG. 16, for ease of description, only parts related to the embodiments of the disclosure are shown. For specific technical details that are not disclosed, refer to the method part in the embodiments of the disclosure. The terminal device may be any terminal device including a mobile phone, a tablet computer, a personal digital assistant (PDA), a point of sales (POS), and an on-board computer, and a mobile phone is used as an example of the terminal device.

FIG. 16 is a block diagram of partial structure of a mobile phone related to a terminal device according to an embodiment of the disclosure. Referring to FIG. 16, the mobile phone includes components such as a radio frequency (RF) circuit 610, a memory 620, an input unit 630, a display unit 640, a sensor 650, an audio circuit 660, a Wi-Fi module 670, a processor 680, and a power supply 690. A person skilled in the art would understand that the structure of the mobile phone shown in FIG. 16 does not constitute a limitation to the mobile phone, and the mobile phone may include more components or fewer components than those shown in the figure, or some components may be combined, or a different component deployment may be used.

The components of the mobile phone are described in detail below with reference to FIG. 16.

The RF circuit 610 may be configured to receive and send a signal in an information receiving and sending process or a call process, and in particular, after downlink information of a base station is received, send the downlink information to the processor 680 for processing. In addition, the RF circuit transmits uplink data to the base station.

The memory 620 may be configured to store a software program and module. The processor 680 runs the software program and module stored in the memory 620, to implement various functional applications and data processing of the mobile phone.

The input unit 630 may be configured to receive input digit or character information, and generate a keyboard signal input related to the user setting and function control of the mobile phone. In an embodiment, the input unit 630 may include a touch panel 631 and another input device 632. The touch panel 631 is also referred to as a touchscreen.

The display unit 640 may be configured to display information input by the user or information provided for the user, and various menus of the mobile phone. The display unit 640 may include a display panel 641. In an example embodiment, the display panel 641 may be configured by using a liquid crystal display (LCD), an organic light-emitting diode (OLED), or the like.

The mobile phone may further include at least one sensor 650 such as an optical sensor, a motion sensor, and other sensors.

The audio circuit 660, a speaker 661, and a microphone 662 may provide audio interfaces between the user and the mobile phone.

Wi-Fi is a short distance wireless transmission technology. The mobile phone may help, by using the Wi-Fi module 670, a user to receive and transmit an email, browse a web page, access stream media, and the like. This provides wireless broadband Internet access for the user.

The processor 680 is a control center of the mobile phone, and is connected to various parts of the entire mobile phone by using various interfaces and lines. By running or executing a software program and/or module stored in the memory 620, and invoking data stored in the memory 620, the processor executes various functions of the mobile phone and performs data processing.

Steps performed by the terminal device in the foregoing embodiments may be based on the structure of the terminal device shown in FIG. 16.

An embodiment of the disclosure further provides a computer-readable storage medium, the computer-readable storage medium storing a computer program, the computer program, when run on a computer, causing the computer to perform the method described in the foregoing embodiments.

An embodiment of the disclosure further provides a computer program product including a program, the program, when being executed on a computer, causing the computer to perform the method described in the foregoing embodiments.

A person skilled in the art would clearly understand that for convenience and conciseness of description, for specific working processes of the foregoing described system, apparatus and unit, reference may be made to the corresponding processes in the foregoing method embodiments, and details are not described herein.

In the several embodiments provided in the disclosure, the disclosed system, apparatus, and method may be implemented in other manners. For example, the described apparatus embodiment is merely exemplary. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of the disclosure may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the disclosure essentially, or the part contributing to the prior art, or all or a part of the technical solutions may be implemented in the form of a software product. The computer software product is stored in a storage medium and includes several instructions for instructing a computer device (which may be a personal computer, a server or a network device) to perform all or some of the steps of the methods described in the embodiments of the disclosure. The foregoing storage medium includes: any medium that may store program code, such as a USB flash drive, a removable hard disk, a read-only memory (ROM), a random access memory (RAM), a magnetic disk, or an optical disc.

Herein, the term "module" may indicate, but is not limited to, a software and/or hardware component, such as a field programmable gate array (FPGA) or an application specific integrated circuit (ASIC), which performs certain tasks. A module may be configured to reside in a tangible addressable storage medium and be configured to execute on one or more processors. For example, a "module" may include components such as software components, object-oriented software components, class components and task components, and processes, functions, routines, segments of program code, drivers, firmware, microcode, circuitry, data, databases, data structures, tables, arrays, and variables. A "module" may be divided into a plurality of "modules" that perform detailed functions.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

An information verification method is provided in the embodiments of the disclosure. A verification server obtains key agreement data in response to a key agreement request transmitted by a terminal device, the key agreement request carrying an identifier of a target user, and the key agreement data including a public key and a first random number. Then, the verification server transmits the key agreement data to the terminal device, so that the terminal device performs encryption processing on to-be-verified information for a target application by using a second random number and the public key and the first random number included in the key agreement data, to obtain to-be-verified ciphertext information. Further, the verification server receives the to-be-verified ciphertext information transmitted by the terminal device, and performs decryption processing on the to-be-verified ciphertext information transmitted by the terminal device, to obtain a first information digest. In this way, the verification server may match the first information digest with a second information digest to obtain an information verification result, and transmits the information verification result to the terminal device, so that the terminal device logs in to an application server of the target application in a case that the information verification result indicates that verification succeeds. In the foregoing mode, before transmitting the to-be-verified information, the terminal device performs encryption processing on the to-be-verified information by using the random numbers and the public key issued by the verification server, to obtain the to-be-verified ciphertext information, so that the to-be-verified ciphertext information is used throughout transmission. In addition, a server of a third-party application cannot decrypt the to-be-verified information even if the to-be-verified ciphertext information is obtained, and the to-be-verified information may be obtained only by the verification server. In this way, the server of the third-party application may be logged in to without exposing privacy information of a user to the third-party application, thereby improving the security of identity verification.

The foregoing embodiments are merely intended for describing the technical solutions of the disclosure, but not for limiting the disclosure. Although the disclosure is described in detail with reference to the foregoing embodiments, a person of ordinary skill in the art are to understand that they may still make modifications to the technical solutions described in the foregoing embodiments or make equivalent replacements to some technical features thereof, and such modifications or replacements will not cause the essence of corresponding technical solutions to depart from the spirit and scope of the technical solutions in the embodiments of the disclosure.

What is claimed is:

1. An information verification method, performed by a verification server, the information verification method comprising:
    obtaining, in response to a key agreement request from a terminal device, key agreement data comprising a public key and a first random number, the key agreement request including an identifier of a target user;
    transmitting, to the terminal device, the key agreement data, based on which, after an application login request to an application server is initiated by the terminal device and to-be-verified information is entered through the terminal device, encryption processing is performed at the terminal device on the to-be-verified information for a target application by using a second random number, the public key, and the first random number included in the key agreement data, to obtain to-be-verified ciphertext information, the to-be-verified information comprising user information corresponding to the target user, the application server being a server of the target application;
    receiving, either from the terminal device or from the application server, the to-be-verified ciphertext information;
    performing decryption processing on the to-be-verified ciphertext information, to obtain a first information digest;
    matching the first information digest with a second information digest, to obtain an information verification result, the second information digest being a stored information digest; and
    transmitting the information verification result to the terminal device, the information verification result indicating a result of logging in to the application server by the terminal device, without providing the to-be-verified information to the server of the target application.

2. The information verification method according to claim 1, wherein the obtaining the key agreement data comprises:
    transmitting a ciphertext generation request to an encryptor;
    receiving, from the encryptor, ciphertext data generated based on the ciphertext generation request, the ciphertext data comprising the public key and the first random number; and
    generating the key agreement data based on the public key and the first random number included in the ciphertext data.

3. The information verification method according to claim 2, wherein the ciphertext data further comprises a public key index value, the public key index value uniquely corresponding to the public key;
    the generating the key agreement data comprises:
    generating a session identifier based on the identifier of the target user included in the key agreement request; and
    generating the key agreement data based on the session identifier, the public key, and the first random number;
    the information verification method further comprising:
    establishing a mapping relationship between the session identifier, the public key, the first random number, and the public key index value; and
    wherein the performing the decryption processing comprises:
    performing, based on the mapping relationship and the session identifier, the decryption processing on the to-be-verified ciphertext information, to obtain the first information digest.

4. The information verification method according to claim 3, wherein the performing the decryption processing based on the mapping relationship and the session identifier comprises:
    obtaining the public key index value from a database based on the mapping relationship and the session identifier;
    transmitting the public key index value to the encryptor; and
    invoking the encryptor to perform the decryption processing on the to-be-verified ciphertext information by using a private key corresponding to the public key, to obtain the first information digest, the public key being determined based on the public key index value.

5. The information verification method according to claim 1, wherein the to-be-verified ciphertext information is generated by the terminal device based on a key ciphertext and a transmission ciphertext, and the performing the decryption processing comprises:
performing decryption processing on the key ciphertext by using a private key corresponding to the public key, to obtain the first random number and the second random number that are used as symmetric keys; and
performing decryption processing on the transmission ciphertext by using the symmetric keys, to obtain the first information digest.

6. The information verification method according to claim 1, further comprising, prior to the matching the first information digest with the second information digest:
obtaining a key index value and to-be-matched ciphertext information from a database;
transmitting the key index value and the to-be-matched ciphertext information to an encryptor; and
invoking the encryptor to perform decryption processing on the to-be-matched ciphertext information, to obtain the second information digest, the second information digest being obtained by the encryptor by performing decryption processing on the to-be-matched ciphertext information by using an information encryption key, the information encryption key being determined based on the key index value.

7. The information verification method according to claim 1, further comprising, after the matching the first information digest with the second information digest:
generating a token based on the information verification result indicating that verification succeeds, a preset usage cycle being set for the token;
transmitting the token to the terminal device;
obtaining, based on the application login request from the terminal device being received, a usage time of the token in response to the application login request, the application login request including the token; and
transmitting an application login success message to the terminal device based on the usage time of the token being within the preset usage cycle.

8. The information verification method according to claim 1, further comprising:
receiving an authentication request from the application server, the authentication request including an application key index and an application key;
performing verification processing on the application key index and the application key in response to the authentication request, to obtain a verification result; and
performing, based on the verification result being successful, the obtaining the key agreement data in response to the key agreement request.

9. The information verification method according to claim 1, further comprising:
receiving an authentication request from the application server, the authentication request including an application key index, a timestamp, a signature random number, and first signature information, the first signature information being obtained by signing a first application key, the timestamp, and the signature random number based on a hash function encryption algorithm;
obtaining a second application key in response to the authentication request and based on the application key index;

signing the second application key, the timestamp, and the signature random number based on the hash function encryption algorithm, to obtain second signature information; and
performing, based on the first signature information and the second signature information being successfully matched, the obtaining the key agreement data in response to the key agreement request.

10. An information verification method, performed by a terminal device, the information verification method comprising:
initiating an application login request to an application server by the terminal device, and entering, through the terminal device, to-be-verified information, the application server being a server of a target application;
transmitting, to a verification server, a key agreement request upon which key agreement data is obtained at the verification server, the key agreement request including an identifier of a target user, and the key agreement data comprising a public key and a first random number;
receiving the key agreement data from the verification server;
performing encryption processing on the to-be-verified information for the target application by using a second random number, the public key, and the first random number included in the key agreement data, to obtain to-be-verified ciphertext information, the to-be-verified information comprising user information corresponding to the target user;
transmitting, to the verification server, the to-be-verified ciphertext information on which decryption processing is performed to obtain first information digest, and the first information digest is matched with second information digest to obtain an information verification result; and
receiving the information verification result from the verification server, the information verification result indicating a result of logging in to the application server by the terminal device, without providing the to-be-verified information to the server of the target application.

11. The information verification method according to claim 10, wherein the performing the encryption processing comprises:
generating the second random number;
using the first random number and the second random number as symmetric keys used by a symmetric encryption algorithm;
performing encryption processing on the symmetric keys by using the public key included in the key agreement data based on an asymmetric encryption algorithm, to obtain key ciphertexts of the symmetric keys;
performing digest calculation on the to-be-verified information for the target application based on a hash function encryption algorithm, to obtain the first information digest;
performing encryption processing on the symmetric keys and the first information digest based on the symmetric encryption algorithm, to obtain a transmission ciphertext; and
generating the to-be-verified ciphertext information based on the key ciphertexts and the transmission ciphertext.

12. An information verification apparatus, comprising:
at least one memory configured to store program code; and at least one processor configured to read the program code and operate as instructed by the program code, the program code including:

obtaining code configured to cause the at least one processor to obtain, in response to a key agreement request from a terminal device, key agreement data comprising a public key and a first random number, the key agreement request including an identifier of a target user;

transmission code configured to cause the at least one processor to transmit, to the terminal device, the key agreement data based on which, after an application login request to an application server is initiated by the terminal device and to-be-verified information is entered through the terminal device, encryption processing is performed at the terminal device on the to-be-verified information for a target application by using a second random number, the public key, and the first random number included in the key agreement data, to obtain to-be-verified ciphertext information, the to-be-verified information comprising user information corresponding to the target user, the application server being a server of the target application;

receiving code configured to cause the at least one processor to receive, either from the terminal device or from the application server, the to-be-verified ciphertext information;

decryption code configured to cause the at least one processor to perform decryption processing on the to-be-verified ciphertext information, to obtain a first information digest; and verification code configured to cause the at least one processor to match the first information digest with a second information digest, to obtain an information verification result, the second information digest being a stored information digest, the transmission code being further configured to cause the at least one processor to transmit the information verification result to the terminal device, the information verification result indicating a result of logging in to the application server by the terminal device, without providing the to-be-verified information to the server of the target application.

13. The information verification apparatus according to claim 12, wherein the obtaining code comprises:

transmitting sub-code configured to cause the at least one processor to transmit a ciphertext generation request to an encryptor;

receiving sub-code configured to cause the at least one processor to receive, from the encryptor, ciphertext data generated based on the ciphertext generation request, the ciphertext data comprising the public key and the first random number; and generating sub-code configured to cause the at least one processor to generate the key agreement data based on the public key and the first random number included in the ciphertext data.

14. The information verification apparatus according to claim 13, wherein the ciphertext data further comprises a public key index value, the public key index value uniquely corresponding to the public key;

the generating sub-code is configured to cause the at least one processor to generate a session identifier based on the identifier of the target user included in the key agreement request; and generate the key agreement data based on the session identifier, the public key, and the first random number;

wherein the program code further comprises:

establishing code configured to cause the at least one processor to establish a mapping relationship between the session identifier, the public key, the first random number, and the public key index value, and wherein the decryption code is configured to cause the at least one processor to perform, based on the mapping relationship and the session identifier, the decryption processing on the to-be-verified ciphertext information, to obtain the first information digest.

15. The information verification apparatus according to claim 14, wherein the decryption code is configured to cause the at least one processor to:

obtain the public key index value from a database based on the mapping relationship and the session identifier;

transmit the public key index value to the encryptor; and invoke the encryptor to perform the decryption processing on the to-be-verified ciphertext information by using a private key corresponding to the public key, to obtain the first information digest, the public key being determined based on the public key index value.

16. The information verification apparatus according to claim 12, wherein the to-be-verified ciphertext information is generated by the terminal device based on a key ciphertext and a transmission ciphertext, and the decryption code is configured to cause the at least one processor to:

perform decryption processing on the key ciphertext by using a private key corresponding to the public key, to obtain the first random number and the second random number that are used as symmetric keys; and perform decryption processing on the transmission ciphertext by using the symmetric keys, to obtain the first information digest.

17. A server, comprising: a memory, a processor, and a bus system, the memory being configured to store a program, the processor being configured to execute the program in the memory to perform the information verification method according to claim 1; and the bus system being configured to connect the memory and the processor.

18. A terminal device, comprising: a memory, a processor, and a bus system, the memory being configured to store a program, the processor being configured to execute the program in the memory to perform the information verification method according to claim 10; and the bus system being configured to connect the memory and the processor.

19. A non-transitory computer-readable storage medium, comprising instructions, the instructions, when run on a computer, causing the computer to perform the information verification method according to claim 1.

20. A non-transitory computer-readable storage medium, comprising instructions, the instructions, when run on a computer, causing the computer to perform the information verification method according to claim 10.

* * * * *